United States Patent [19]

Miyahara et al.

[11] Patent Number: 5,351,139
[45] Date of Patent: Sep. 27, 1994

[54] APPARATUS FOR PHOTOGRAPHING PHOTOGRAPHED FILM

[75] Inventors: Kazuhiko Miyahara, Yokohama; Takao Kinoshita, Tokyo; Kenichi Kawamoto, Komae; Toshiya Kurihashi, Kokubunji; Kaneyoshi Tokano, Tokyo, all of Japan

[73] Assignee: Canon Kabushiki Kaisha, Tokyo, Japan

[21] Appl. No.: 982,576

[22] Filed: Nov. 27, 1992

[30] Foreign Application Priority Data

| Nov. 28, 1991 [JP] | Japan | 3-314565 |
| Mar. 25, 1992 [JP] | Japan | 4-067066 |
| Jun. 18, 1992 [JP] | Japan | 4-182812 |
| Jun. 25, 1992 [JP] | Japan | 4-190164 |
| Aug. 24, 1992 [JP] | Japan | 4-247250 |

[51] Int. Cl.$^5$ .............................................. H04N 1/04
[52] U.S. Cl. .................................. 358/487; 358/474; 358/471; 355/45
[58] Field of Search ............... 358/487, 471, 909, 401, 358/474, 471, 214, 482, 483; 355/43, 51, 65, 66, 39, 45; 353/25–27 A, 120

[56] References Cited

U.S. PATENT DOCUMENTS

| 4,989,099 | 1/1991 | Koshiyouji et al. | 358/487 |
| 5,016,045 | 5/1991 | Watanabe | 355/45 |
| 5,034,822 | 7/1991 | Stevens | 358/909 |
| 5,113,268 | 5/1992 | Yoshida et al. | 358/487 |
| 5,126,860 | 6/1992 | Nagano | 358/487 |

FOREIGN PATENT DOCUMENTS 092680 5/1984 Japan.

Primary Examiner—Edward L. Coles, Sr.
Assistant Examiner—Fan Lee
Attorney, Agent, or Firm—Fitzpatrick, Cella, Harper & Scinto

[57] ABSTRACT

There is disclosed an apparatus including a guide member for guiding a photographed film, an illumination unit for illuminating the film, a reflection member for reflecting light from the film, a conversion unit for photoelectrically converting light reflected by the reflection member, and a housing which builds in at least the conversion unit and the illumination unit.

1 Claim, 29 Drawing Sheets

FIG. 14A  FIG. 14B  FIG. 14C
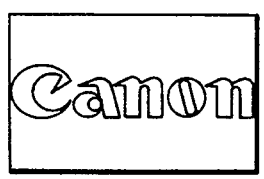 → 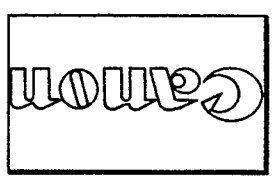 → 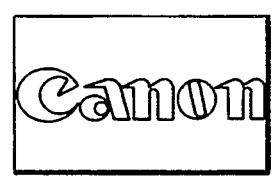
FIG. 15A  FIG. 15B  FIG. 15C
 → 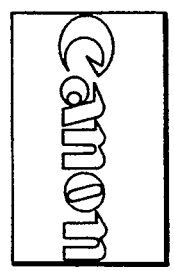 → 
FIG. 16A  FIG. 16B
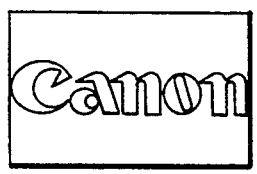 → 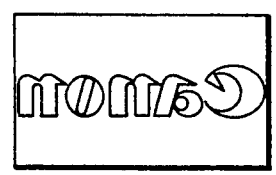

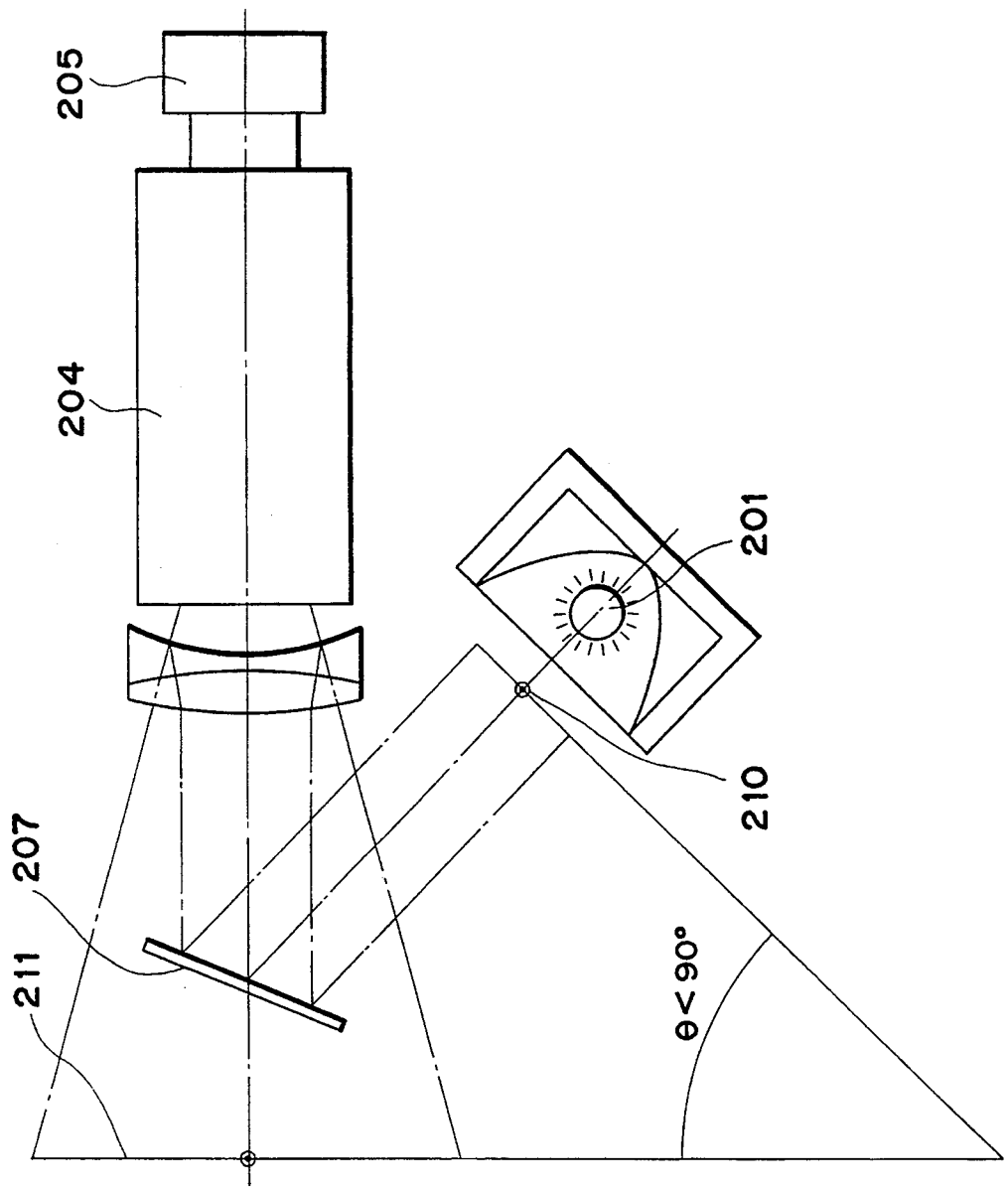

APPARATUS FOR PHOTOGRAPHING PHOTOGRAPHED FILM

BACKGROUND OF THE INVENTION

1. Field of the Invention

The present invention relates to a photographing apparatus and, more particularly, to a photographing apparatus for photographing an image on an image recording medium such as a photographed film.

2. Related Background

A conventional apparatus of this type is used for photographing an image on a positive film photographed by, e.g., a still camera or for reversely photographing an image on a negative film as a positive image, converting the photographed image into an electrical signal using an image pickup element such as a CCD, and displaying the image on, e.g., a television screen.

The prior arts of the photographing apparatus will be described below with reference to FIGS. 6 and 7.

As shown in FIGS. 6 and 7, the conventional apparatuses has a linear layout. FIG. 6 is an exploded perspective view of a conventional apparatus laid out in the vertical (longitudinal) direction, and FIG. 7 is an exploded perspective view of a conventional apparatus laid out in the horizontal (lateral) direction. These apparatuses respectively comprise photographing systems 1d and 1e which are connected to photographing optical systems 2d and 2e, respectively. The apparatuses respectively comprise film guides 6d and 6e, which respectively have central opening windows 5d and 5e, the centers of which coincide with optical axes 4d and 4e of the optical systems 2d and 2e, and respectively receive film holders 7d and 7e for holding films 10d and 10e. Light sources 8d and 8e are respectively arranged on the back surfaces of the film guides, so that light beams emitted from the light sources are deflected toward the opening windows 5d and 5e by reflection plates 9d and 9e.

In the prior arts, since the light source, the film guide, and the imaging optical system are linearly laid out, the following problems are posed.

When the members are laid out in the vertical (longitudinal) direction, the apparatus is elongated in the vertical direction, and has a small bottom area, resulting in poor stability when the apparatus is placed on some object.

When the members are laid out in the horizontal (lateral) direction, the apparatus has a large bottom area, resulting in a poor space factor. Since the total length becomes large, the apparatus becomes bulky as a whole. As a related art, Japanese Laid-Open Patent Application No. 59-92680 is known.

SUMMARY OF THE INVENTION

It is the first object of the present invention to provide a compact photographing apparatus allowing observation of a film.

It is the second object of the present invention to provide an apparatus, which allows observation of not only a film but also other objects, e.g., a printed picture with a simple operation.

BRIEF DESCRIPTION OF THE DRAWINGS

FIGS. 14A to 14C are views showing image conversion in the embodiment shown in FIGS. 8A and 8B;

FIGS. 15A to 15C are views showing image conversion in the embodiment shown in FIG. 9;

FIGS. 16A and 16B are views showing image conversion in the embodiment shown in FIGS. 10A and 10B;

FIG. 34 is a front view for explaining the embodiment shown in FIG. 32;

DESCRIPTION OF THE PREFERRED EMBODIMENTS

Figure 1:
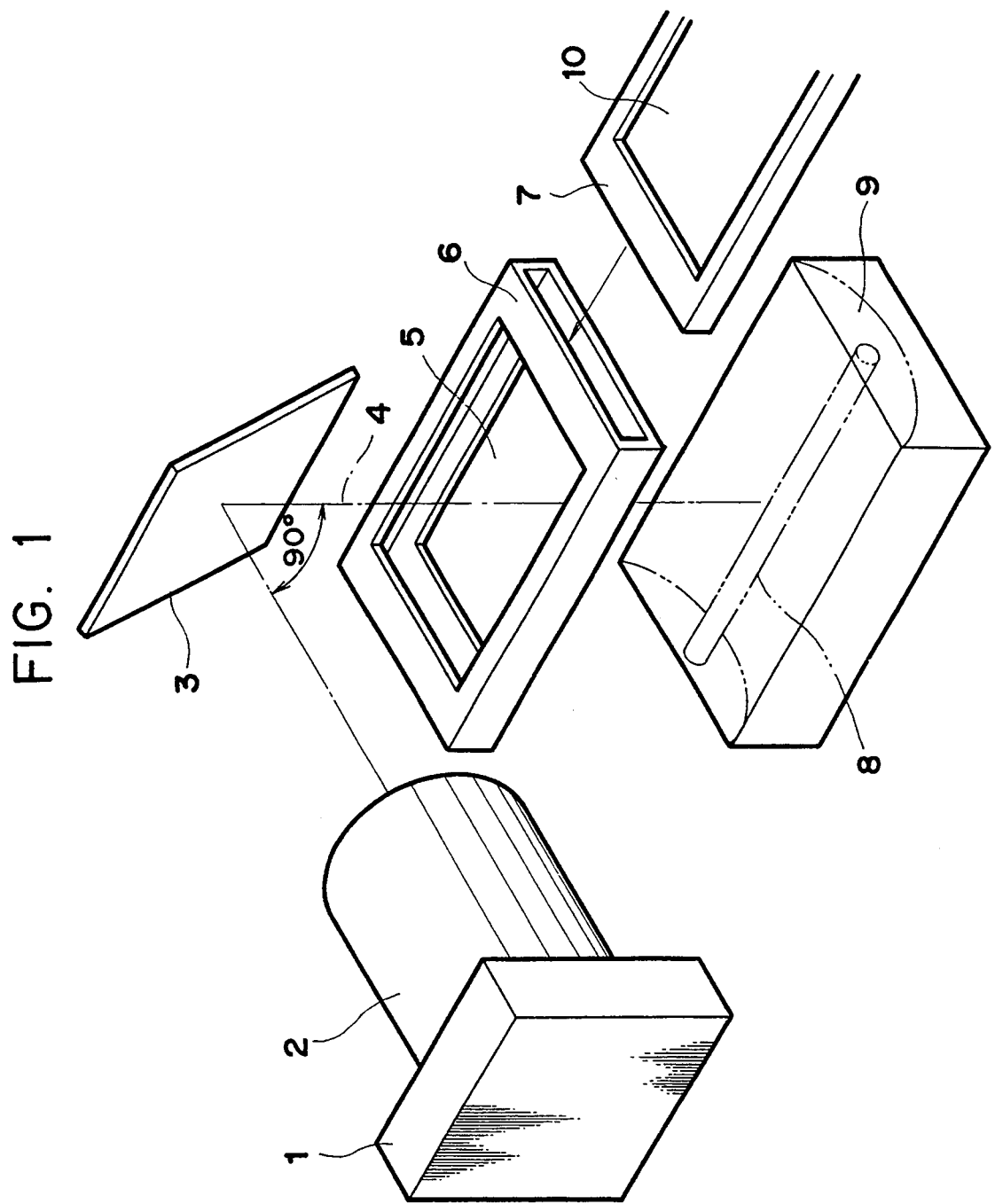
FIG. 1 is an exploded perspective view of a photographing apparatus according to the first embodiment of the present invention.
Figure 2:
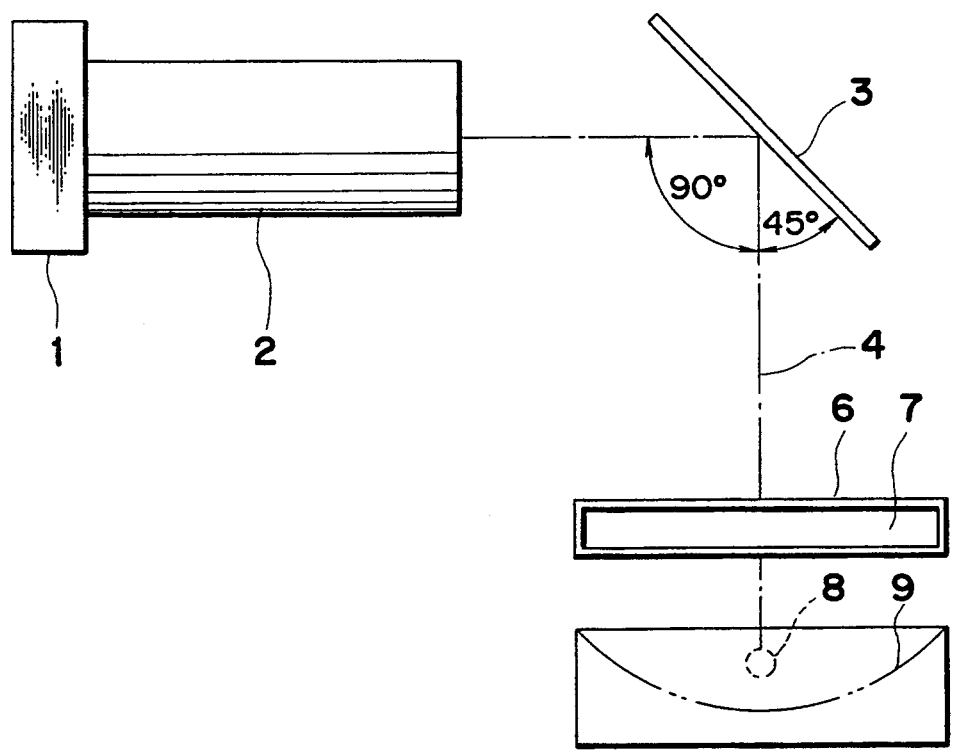
FIG. 2 is a side view of the apparatus shown in FIG. 1.

FIGS. 1 and 2 are respectively a perspective view and a side view showing an apparatus according to the first embodiment of the present invention. Referring to FIG. 1, the apparatus includes a known photographing unit 1, including a photoelectric conversion element such as a CCD, for electrically processing a conversion signal, an optical system 2 for forming an image on a photographing surface of the photographing unit 1, a mirror 3 for deflecting an optical axis 4 at a right angle, a film guide 6 which has a central opening window 5, and receives and holds a film holder 7 that holds a film 10 facing down, a light source 8, and a reflection plate 9. FIG. 2 is a side sectional view of this apparatus. As can be seen from FIG. 2, the film guide 6, the light source 8, and the reflection plate 9 are horizontally arranged on a bottom portion, and the mirror 3 is arranged along the vertical optical axis at an angle of 45° from the horizontal plane so as to deflect the optical axis through 90° in the horizontal direction. Thus, since a film is photographed by the imaging optical system arranged in an upper portion of the apparatus, the apparatus can be rendered compact as compared to a conventional apparatuses.

Figure 3:
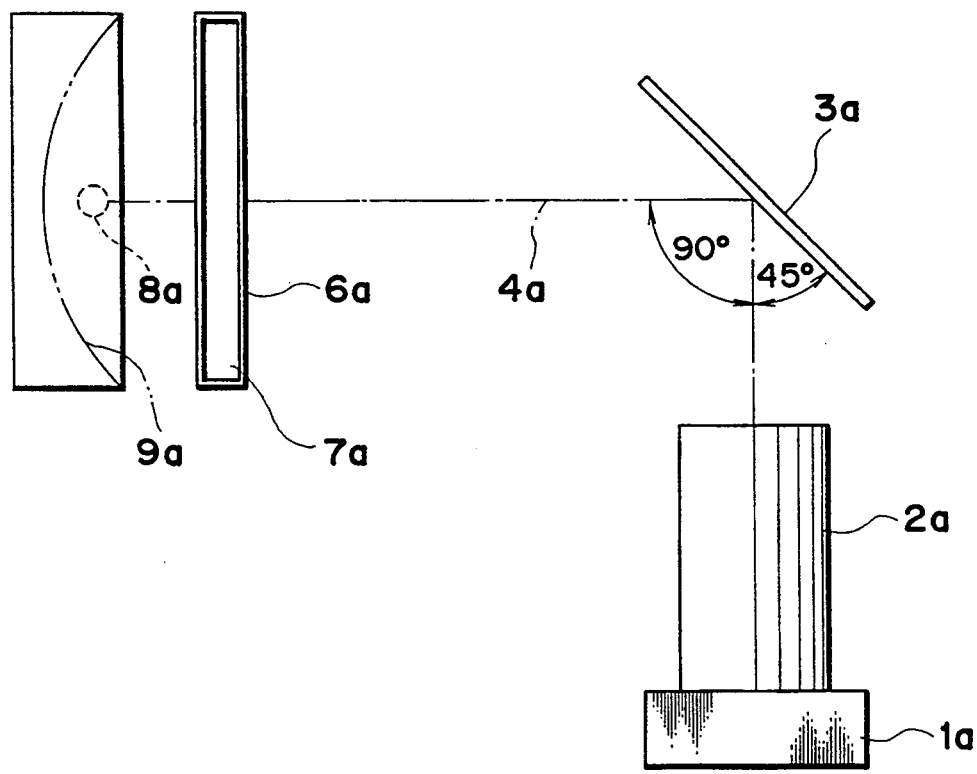
FIG. 3 is a side view of a photographing apparatus according to the second embodiment of the present invention.
Figure 4:
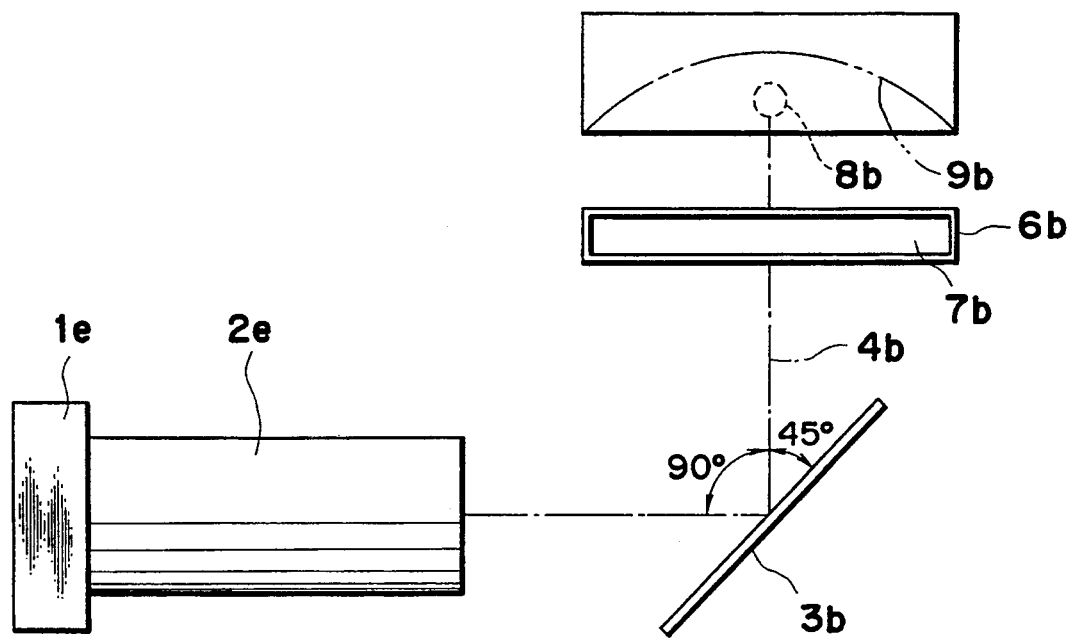
FIG. 4 is a side view of a photographing apparatus according to the third embodiment of the present invention.
Figure 5:
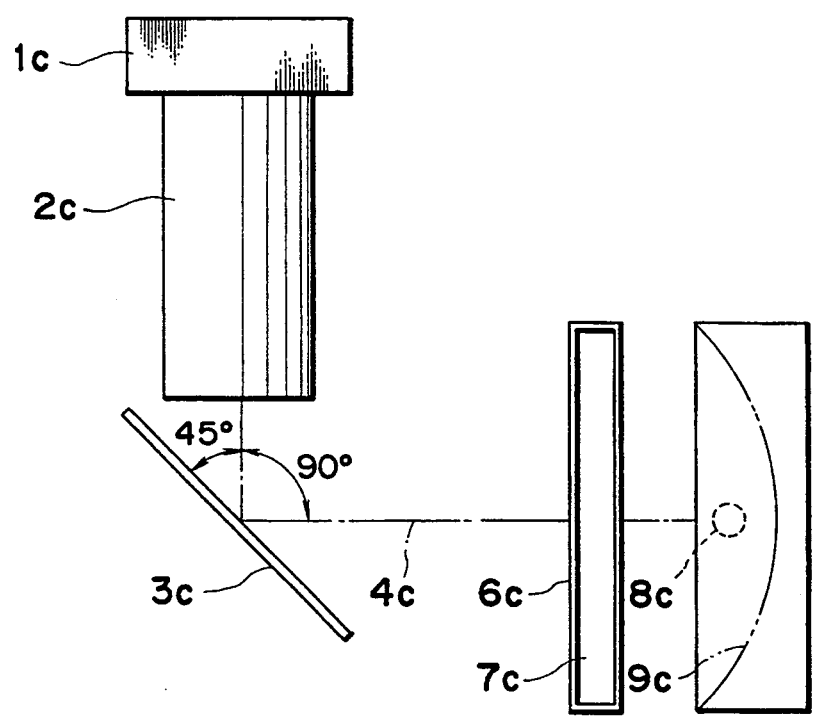
FIG. 5 is a side view of a photographing apparatus according to the fourth embodiment of the present invention.
Figure 6:
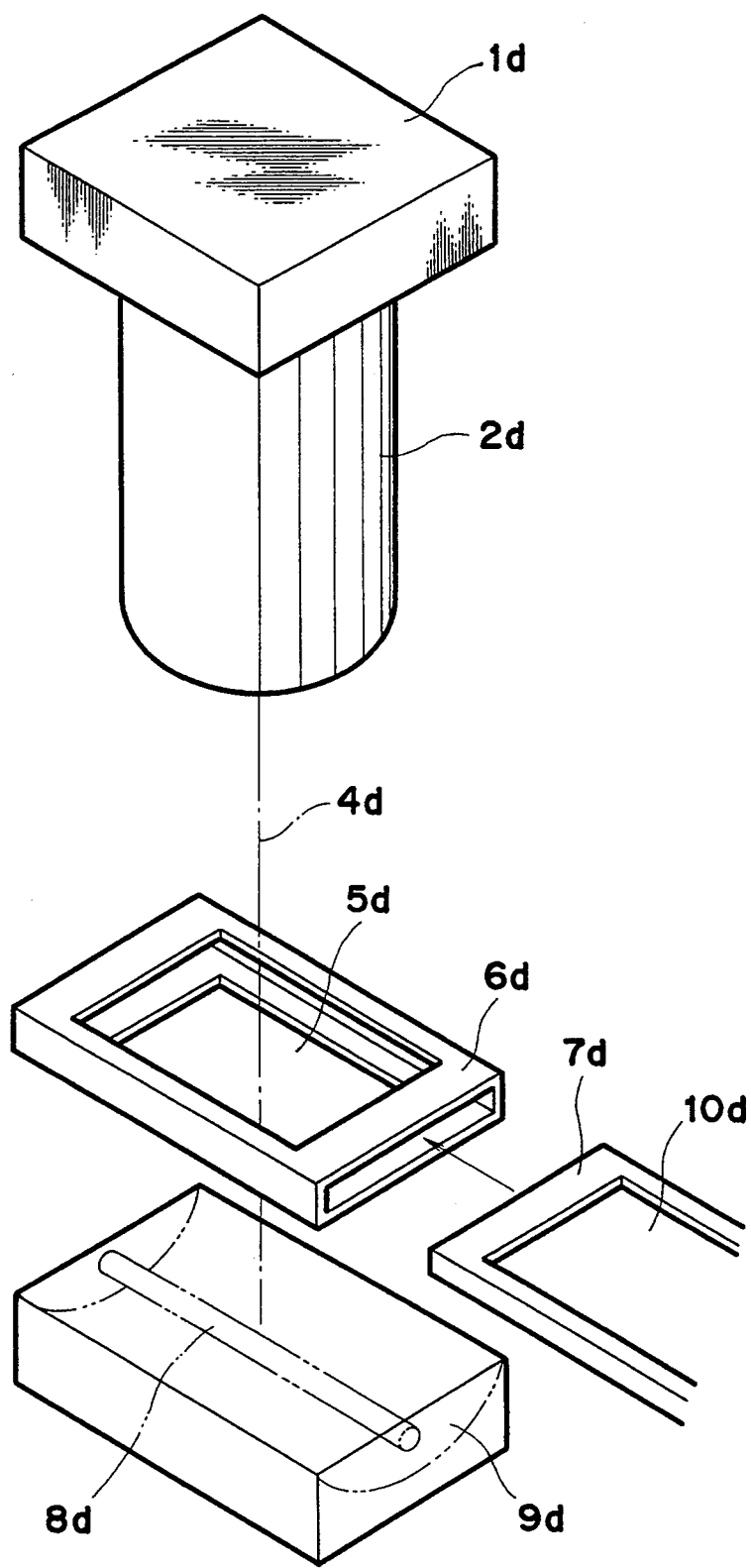
FIG. 6 is an exploded perspective view showing a conventional apparatus.
Figure 7:
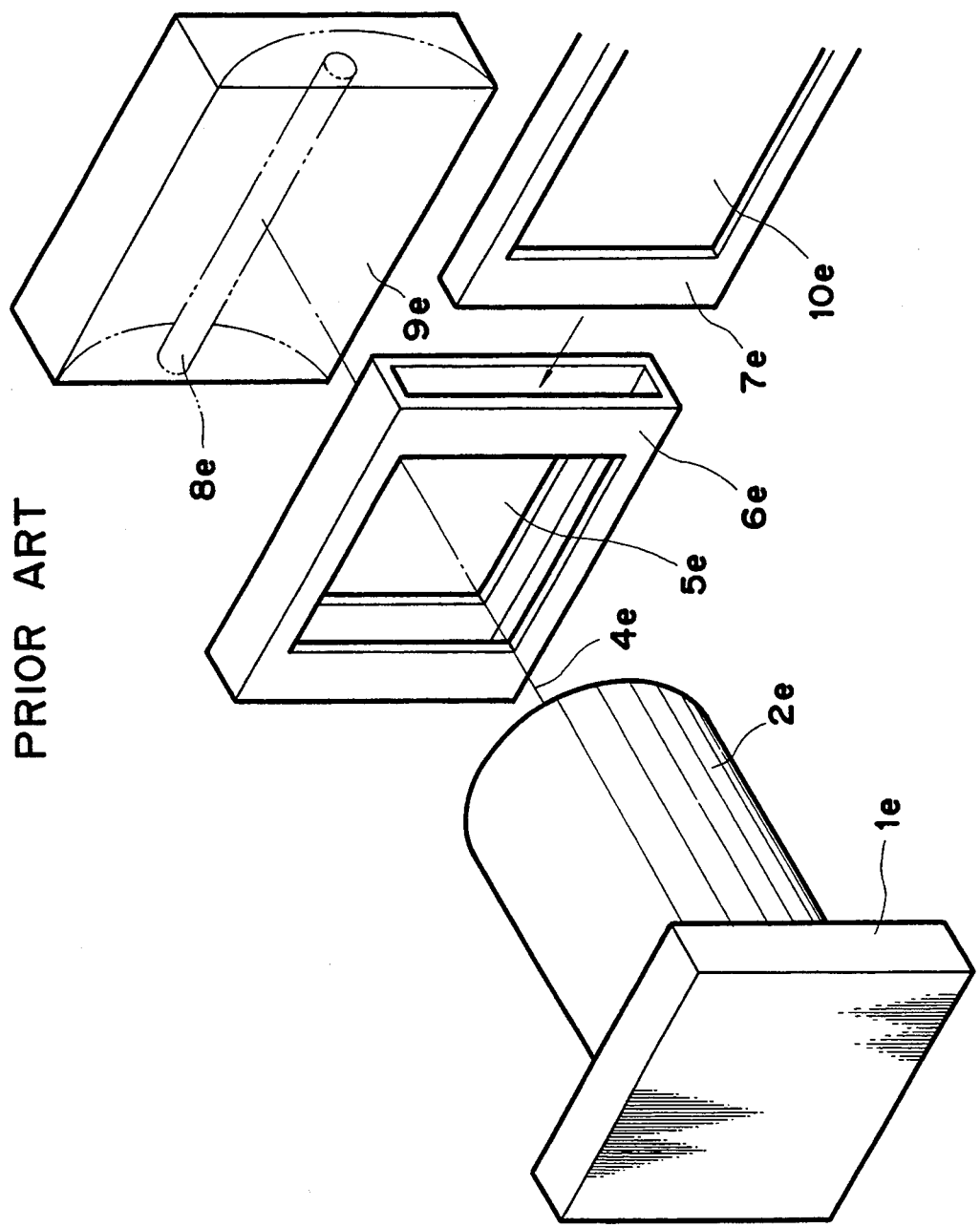
FIG. 7 is an exploded perspective view showing another conventional apparatus.

FIGS. 3, 4, and 5 are exploded perspective views showing other embodiments of the present invention.

In the embodiment shown in FIG. 3, an imaging optical system (a photographing unit 1a and an optical system 2a) is arranged on a bottom portion to extend in the vertical direction, and a mirror 3a is arranged on the optical axis of the imaging optical system at an angle of 45° from the horizontal plane so as to deflect the optical axis through 90° in the horizontal direction. A film holder 7a is arranged in an upper left portion of the apparatus. Thus, an image on a film held facing down by the film holder 7a can be photographed.

In the embodiment shown in FIG. 4, a photographing unit 1b and an optical system 2b are arranged on a bottom portion to extend in the horizontal direction, and a mirror 3b is arranged along the horizontal optical axis at an angle of 45° from the horizontal plane so as to deflect the optical axis through 90°. A film holder 7b is arranged in an upper portion of the apparatus. Thus, an image on a film held facing down by the film holder 7a can be photographed.

In the embodiment shown in FIG. 5, a film guide 6c, a light source 8c, and a reflection plate 9c are vertically arranged on a bottom portion, and a mirror 3c is arranged along the horizontal optical axis at an angle of 45° from the horizontal plane so as to deflect the optical axis through 90°. An imaging optical system (an optical system 2c and a photographing unit 1c) is arranged in an upper portion of the apparatus to photograph an image on a film.

As described above, a photographing apparatus of the present invention, which comprises a mirror for deflecting the optical axis, has the following effects.

(1) A conventional apparatus, in which a reflection plate, a light source, a film guide, and an imaging optical system are linearly arranged along the optical axis, has a large total length, while the apparatus of the present invention can be rendered compact.

(2) As compared to a conventional apparatus, in which a reflection plate, a light source, a film guide, and an imaging optical system are linearly arranged along the vertical optical axis, the apparatus of the present invention has a large bottom area, resulting in good stability upon placing on some object. In addition, operability can be improved.

In each of the embodiments described above, a photographing apparatus comprises only one reflection mirror to realize a compact structure. In the following description, problems posed when only one mirror is used will be discussed, and an embodiment, which can solve these problems, will be explained.

Figure 10A:
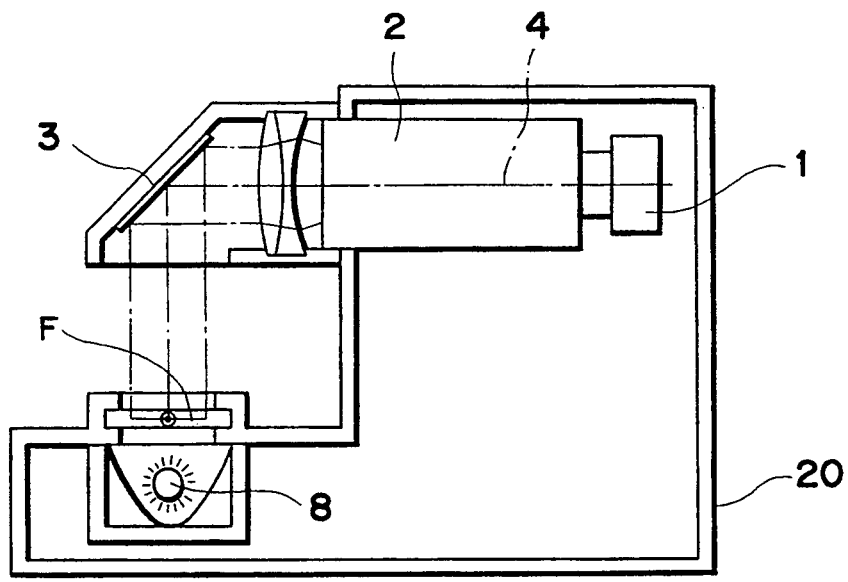
FIGS. 10A and 10B are respectively a sectional view and a perspective view showing the apparatus shown in FIG. 1.
Figure 10B:
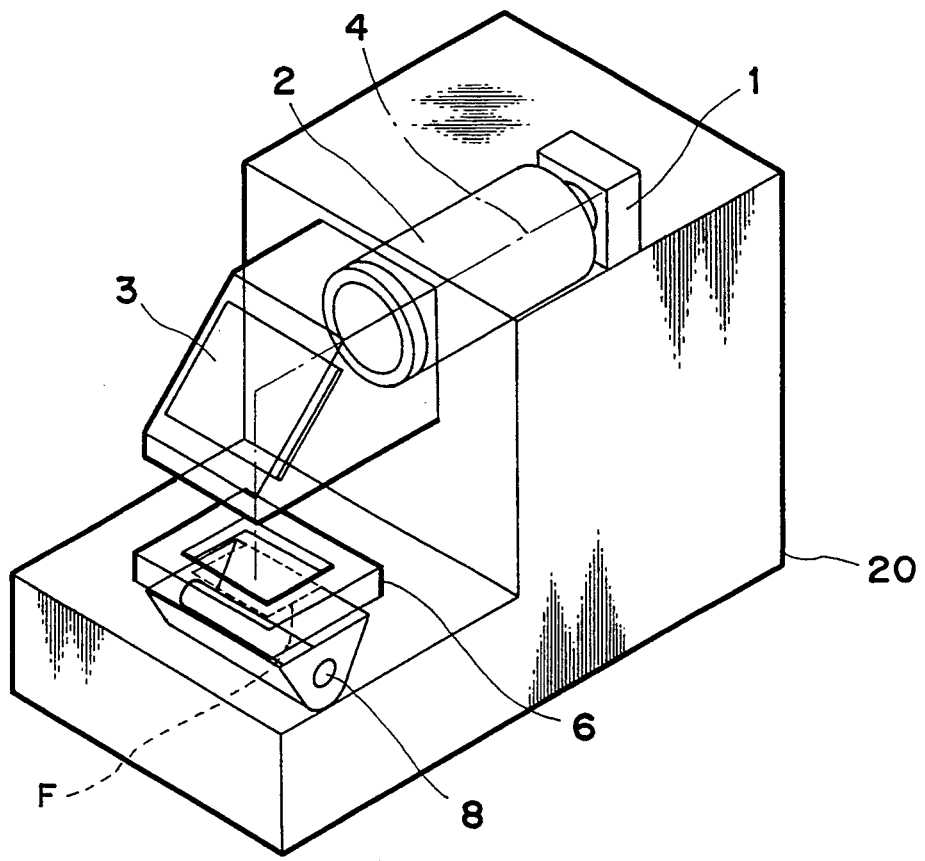

FIGS. 10A and 10B are respectively a side view and a perspective view showing the assembled state of the photographing apparatus described above. Referring to FIG. 10A, light emitted from the light source 8 is transmitted through and illuminates a film F set on a film setting surface. Light transmitted through the film F is deflected by the reflection mirror 3, and reaches the optical block (system) 2. The optical axis 4 of the optical block 2 coincides with the ray of light passing through the center of the imaging region of the film surface F, and deflected by the reflection mirror 3. An image formed on the film surface F is imaged on an image pickup element in the photographing block (unit) 1 by a photographing optical system in the optical block 2, and is subjected to a photographing operation. The apparatus further has a housing 20.

However, in this apparatus, since an image on the film surface F as an object is imaged on the image pickup element via only one reflection element, the image is reversed.

Figure 13:
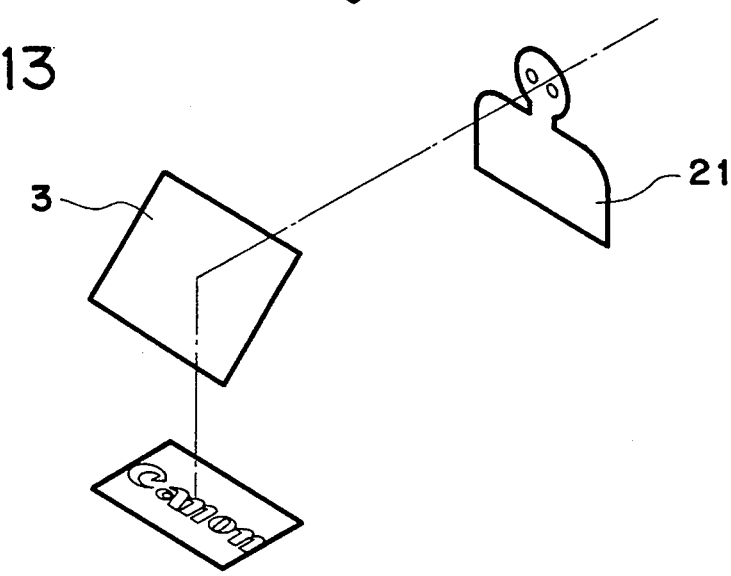
FIG. 13 is an explanatory view of a reflection state in the embodiment shown in FIGS. 10A and 10B.

For this reason, a processing circuit capable of receiving a mirror image is required as electrical processing of the image pickup element. FIG. 13 shows a state wherein a photographer 21 observes an object via a reflection mirror. Although an object is arranged, as shown in FIG. 16A, an image whose right and left sides are reversed is imaged on the image pickup element, as shown in FIG. 16B. For this reason, as the image pickup element, an element with a special function of scanning a video signal in the opposite direction, i.e., a so-called mirror image output function is indispensable, and the selection range of elements is narrowed. Since the mirror image output function is a non-standard function, cost tends to increase slightly.

In the embodiment to be described below, the direction of the optical axis of a photographing optical system is converted an even number of times using an optical member between the film F and the image pickup element so as to obtain an image to be printed as a normal image in place of a mirror image. As a result, the distance between an object and the image pickup element is folded, and the entire apparatus can be rendered compact. With this arrangement, the degree of freedom of design can be increased, and a standard image pickup element having no mirror image output function can be utilized. Therefore, a photographing apparatus, which is advantageous in terms of cost, can be provided.

Figure 8A:
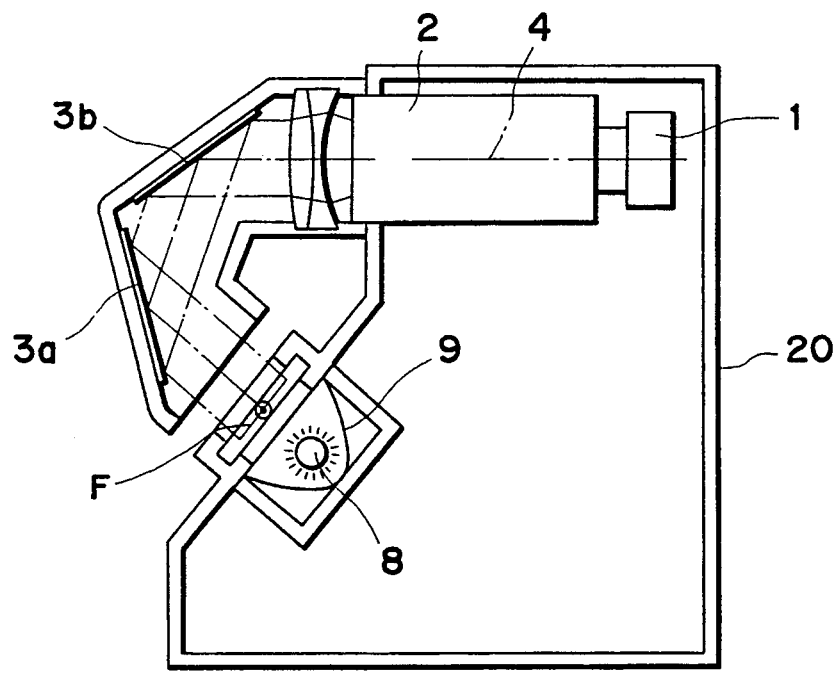
FIGS. 8A and 8B are respectively a sectional view and a perspective view showing an apparatus according to the fifth embodiment of the present invention.
Figure 8B:
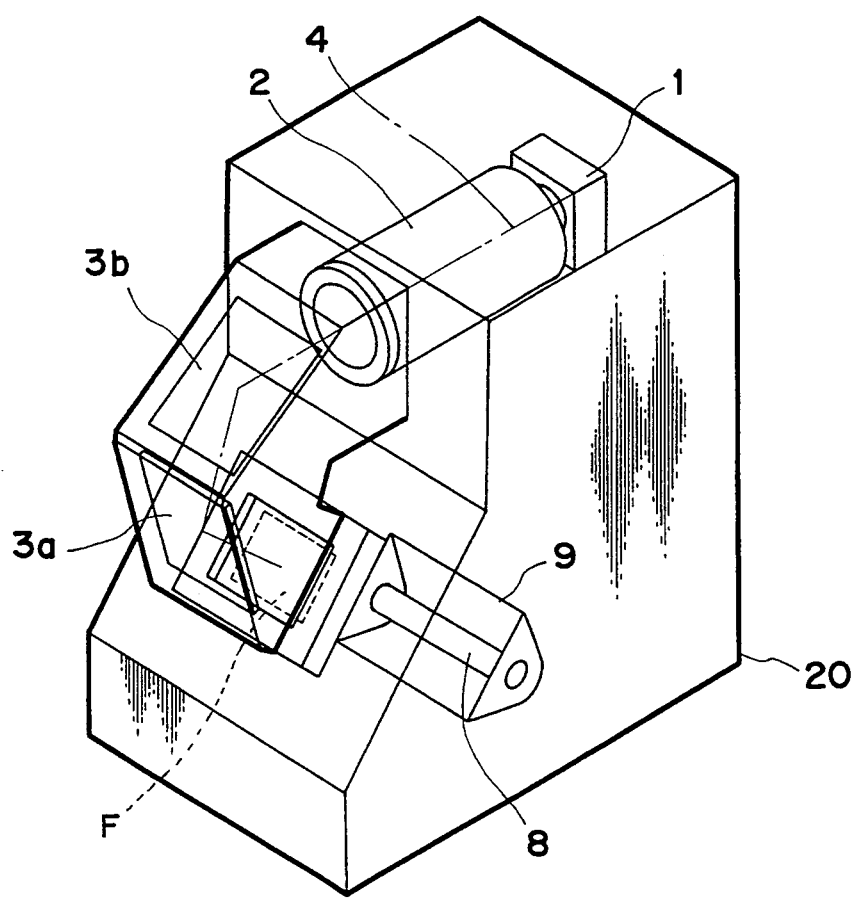

FIGS. 8A and 8B are respectively a sectional view and a perspective view showing the fifth embodiment of the present invention. The same reference numerals in FIGS. 8A and 8B denote the same parts as in the above embodiments. The apparatus shown in FIGS. 8A and 8B includes an illumination light source 8, a film surface F as an object, an optical axis 4 of a photographing optical system, reflection mirrors 3a and 3b, an optical block 2 including a photographing optical system lens, a photographing block 1 including an image pickup element, and a photographing apparatus main body 20.

The operation of this embodiment will be described below with reference to FIG. 8A. In FIG. 8A, when the light source 8 is turned on, light illuminates the film F set on a film setting surface directly or via a reflection mirror 9 juxtaposed to the light source. The light transmitted through the film F is reflected by the reflection mirror 3a, thus converting the direction of the optical axis. The reflected light is then guided to the reflection mirror 3b, and undergoes the second reflection to convert the direction of the optical axis. The light then reaches the optical block 2. The light from the object is transmitted through the photographing optical system in the optical block 2, and is imaged on the image pickup element of the photographing block 1 as a normal image. The image is then photographed. In general, the object (film) F is imaged on the image pickup element in a reduced scale, and for this reason, it is advantageous for the arrangement of the apparatus to arrange the reflection mirrors between the object and the photographing block like in this embodiment.

Figure 11:
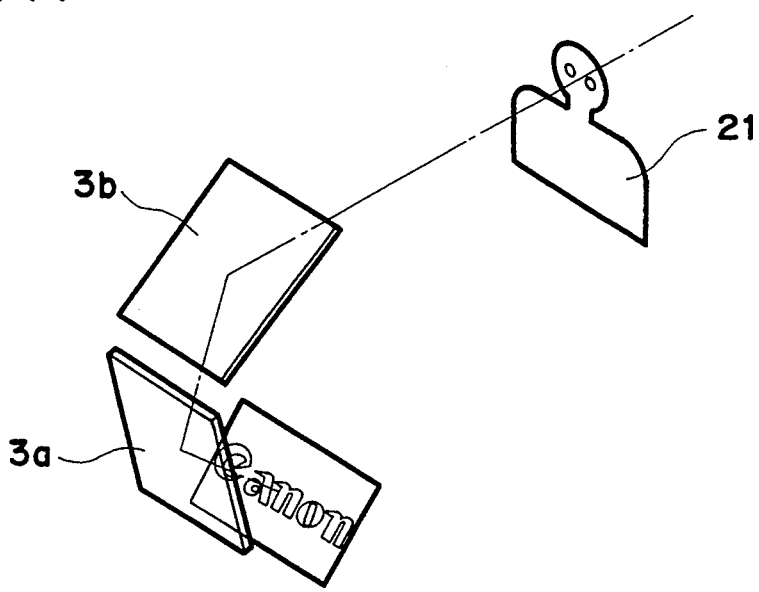
FIG. 11 is an explanatory view of a reflection state in the embodiment shown in FIGS. 8A and 8B.

FIG. 11 helps understanding of the relationship of an object image imaged on the image pickup element and the object in this embodiment. The object image is observed via the two reflection mirrors. FIGS. 14A to 14C show the reversal relationship of an image at this time. More specifically, an object arranged, as shown in FIG. 14A, is imaged, as shown in FIG. 14B after two reflections. This image is not a mirror image, but an image obtained by rotating an object image through 180°. Therefore, the image pickup element need only be arranged to be rotated through 180°, and a normal image pickup element having no mirror image output function can then obtain a normal image output.

Figure 9:
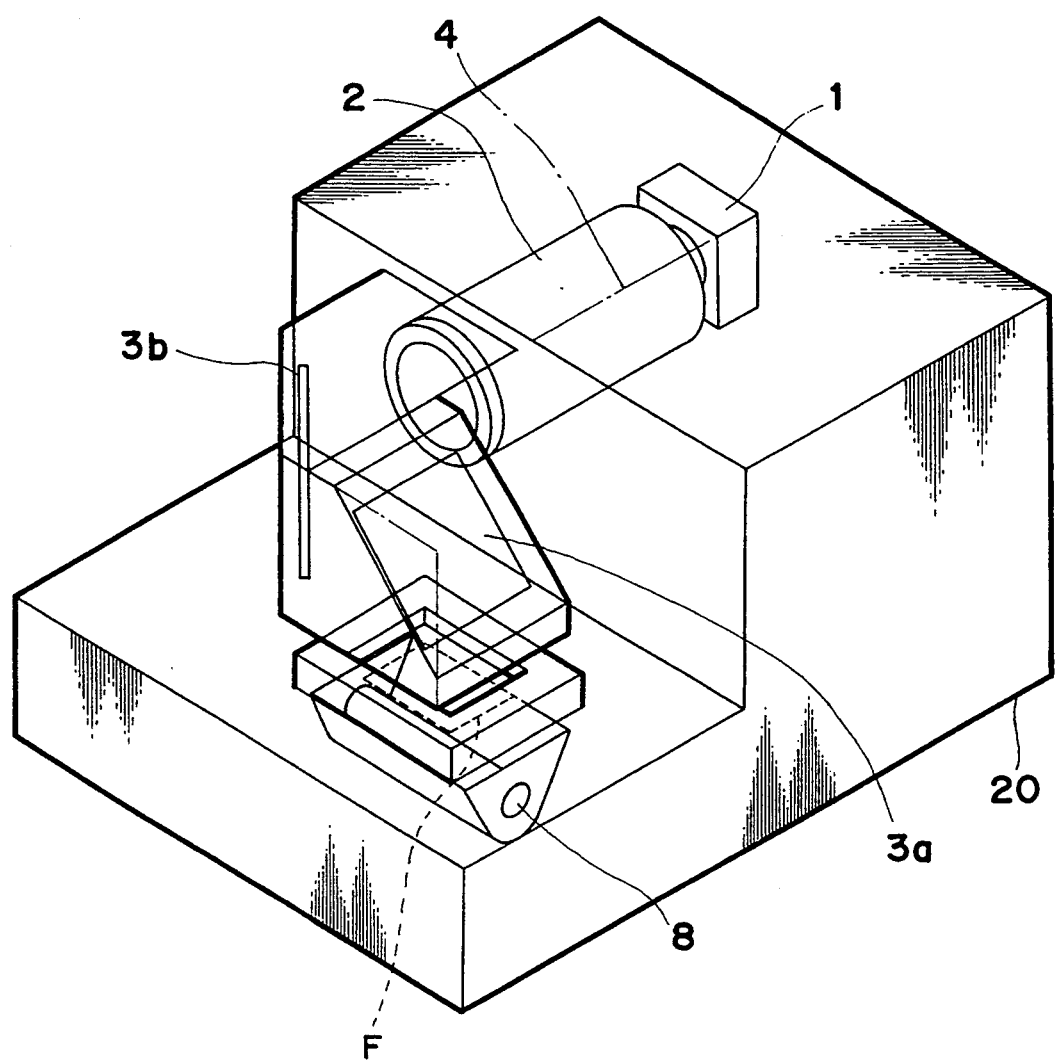
FIG. 9 is a perspective view showing an apparatus according to the sixth embodiment of the present invention.
Figure 12:
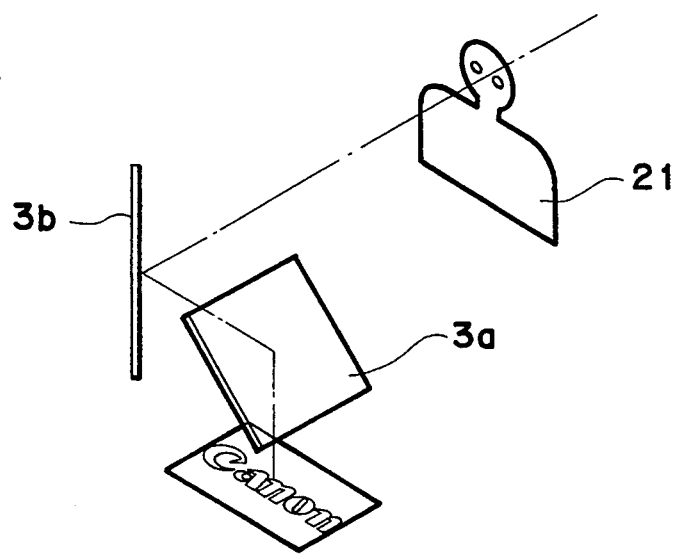
FIG. 12 is an explanatory view of a reflection state in the embodiment shown in FIG. 9.

FIG. 9 is a perspective view of the sixth embodiment of the present invention. The same reference numerals in FIG. 9 denote the same parts as in FIG. 8. The characteristic feature of this embodiment is the arrangement of reflection mirrors 3a and 3b. More specifically, in the embodiment shown in FIG. 8, the optical axis is deflected in a single plane, but in this embodiment, the optical axis is deflected three-dimensionally. FIG. 12 shows the reversal relationship of an image like in FIG. 11. At this time, an object arranged, as shown in FIG. 15A is imaged as an image rotated through 90° although it is a normal image. Therefore, the image pickup element need only be arranged to be rotated through 90°, thus obtaining a normal image output, as shown in FIG. 15C.

Various other arrangements of the optical system via an even number of times of reflections may be proposed. For example, a reflection element such as a roof prism used in a pentagonal prism of a single-lens reflex camera may be used, and a larger even number of times of reflections may be used. The positions of the reflection mirrors are not limited to those between the object and the photographing block but may be located between the photographing block and the image pickup element block. In either case, a normal image output can be easily obtained by rotating the image pickup element in correspondence with the deflection relationship of the optical system as long as a normal image can be imaged.

As described above, according to the present invention, in a photographing apparatus for photographing an image formed on an optical film, the optical axis of a photographing optical system is deflected an even number of times using an optical member. With this arrangement, the distance between an object and an image pickup element is folded, and a compact apparatus with a high degree of freedom of design can be realized. In addition, since a normal image is imaged, a standard image pickup element having no mirror image output function can be utilized. Therefore, an apparatus advantageous in cost can be realized.

An embodiment of an apparatus which can be used as both the above-mentioned film photographing apparatus and a normal video camera will be described below.

Figure 17:
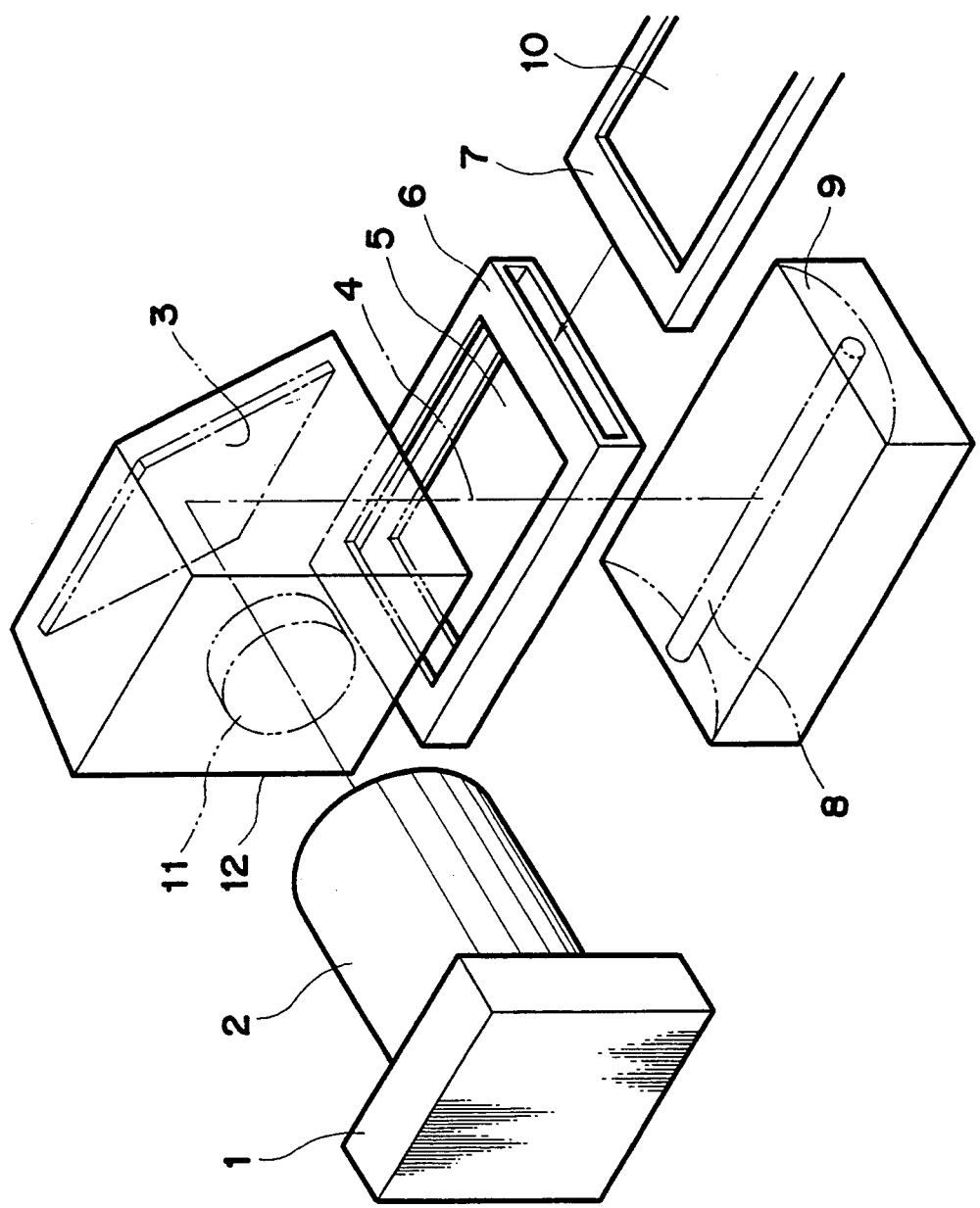
FIG. 17 is an exploded perspective view showing main part of an apparatus according to the seventh embodiment of the present invention.

FIGS. 17 and 18 are respectively an exploded perspective view of an apparatus according to this embodiment and a perspective view of the overall apparatus. FIG. 19 is a sectional view showing main part of the apparatus. In FIGS. 17 and 18, the apparatus includes a conversion unit 1, having an image pickup element, for converting an optical image into a video signal, a main photographing lens 2, and a unit 12 integrally including a reflection plate (mirror) 3 and a macro photographing lens 11, and detachable from the main body. The apparatus also includes a film holder 7, a film guide 6 for receiving the film holder 7, and guiding a film, a light source 8, and a reflection plate 9.

With this arrangement, the film is illuminated with the light source 8, and this illumination light is imaged on the image pickup element of the conversion unit 1 via the reflection mirror 3, the macro photographing lens 11, and the main photographing lens 2. The conversion unit converts an optical image formed by a lens system including the main photographing lens and the macro photographing lens into a video signal, and supplies this video signal to a television receiver. Then, the image on the film is observed via the television screen.

When an object other than a film, e.g., a printed matter or a landscape is to be photographed, the unit including the macro photographing lens and the reflection mirror is detached from the apparatus main body. Thus, since the main photographing lens is aberration-corrected so as to be able to photograph a far object, such an object can be satisfactorily photographed.

Figure 18A:
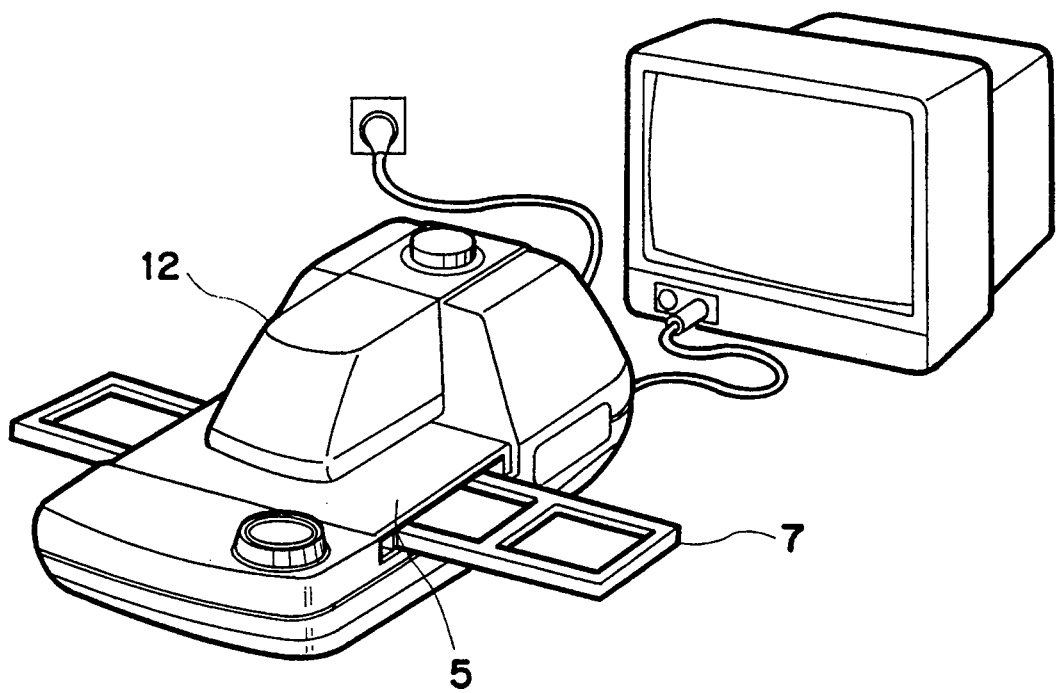
FIGS. 18A and 18B are perspective views of the overall apparatus according to the seventh embodiment.
Figure 18B:
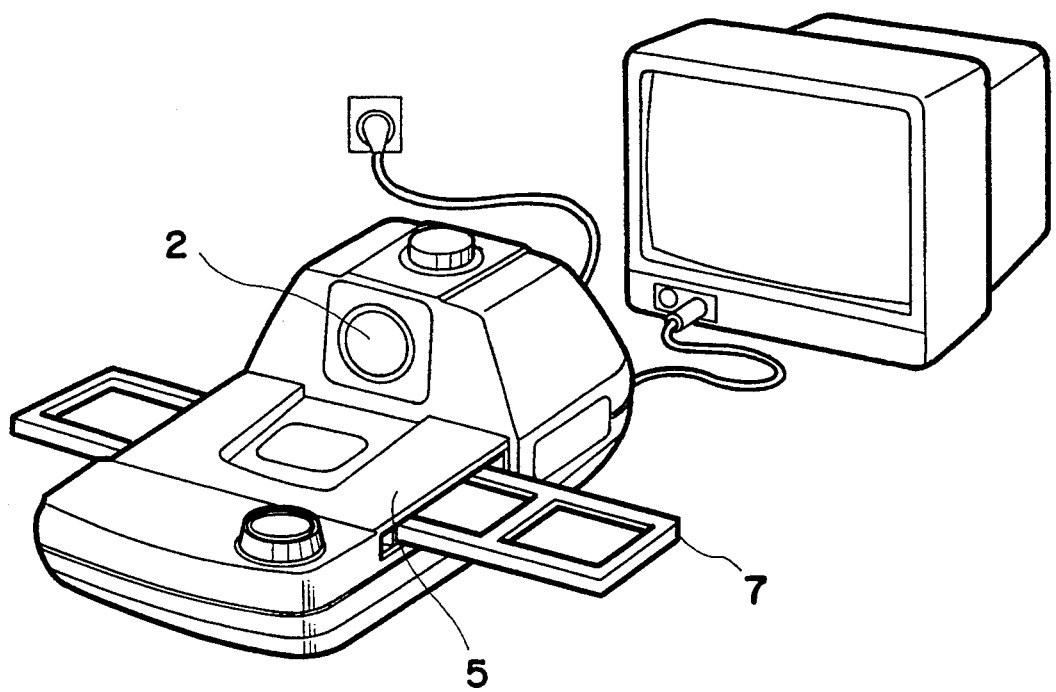
Figure 19:
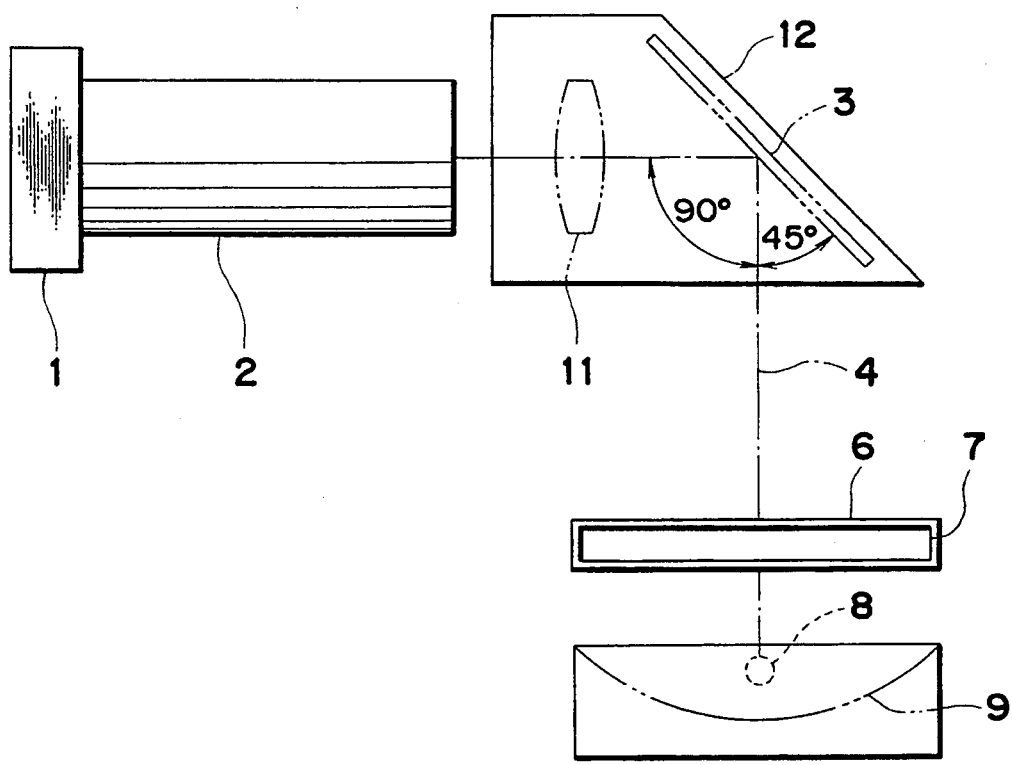
FIG. 19 is a sectional view of main part of the apparatus according to the seventh embodiment.

FIGS. 18A and 18B are perspective views of the overall apparatus. FIG. 18A shows a film photographing state, and FIG. 18B shows a normal photographing state, i.e., a state wherein the unit 12 is detached. FIG. 19 is a sectional view showing main part of the apparatus. As can be seen from FIG. 19, the reflection mirror 3 is inclined to reflect the ray on an optical axis 4 through 90°.

Figure 20:
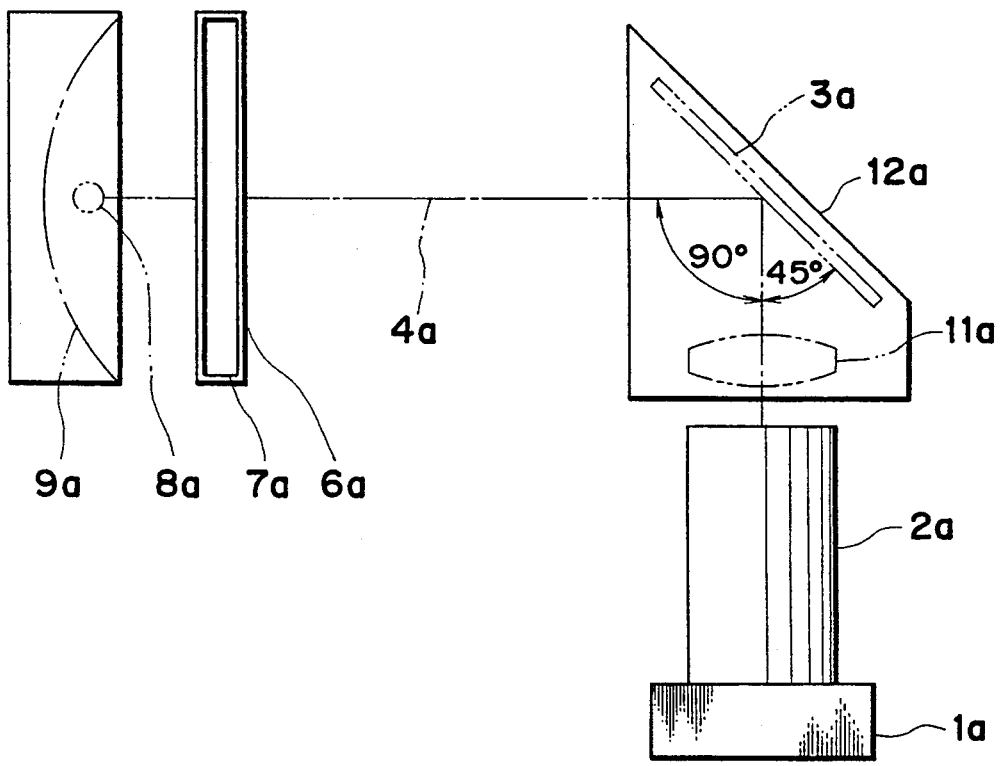
FIG. 20 is a sectional view of main part of the apparatus according to the seventh embodiment.
Figure 21:
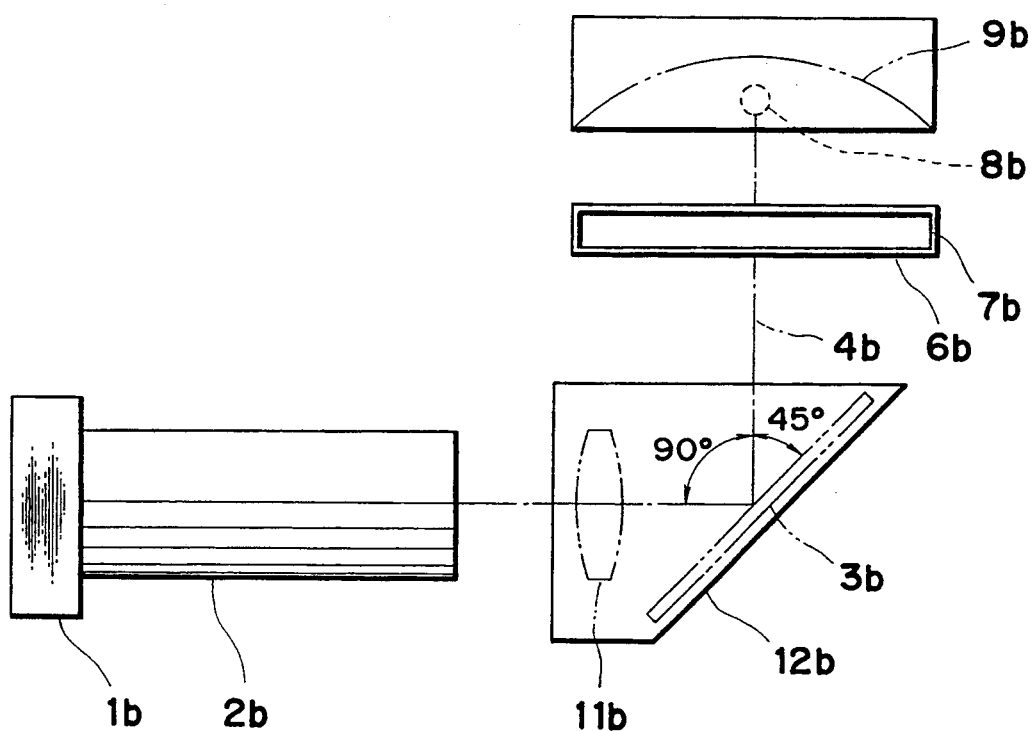
FIG. 21 is a sectional view of main part of the apparatus according to the seventh embodiment.
Figure 22:
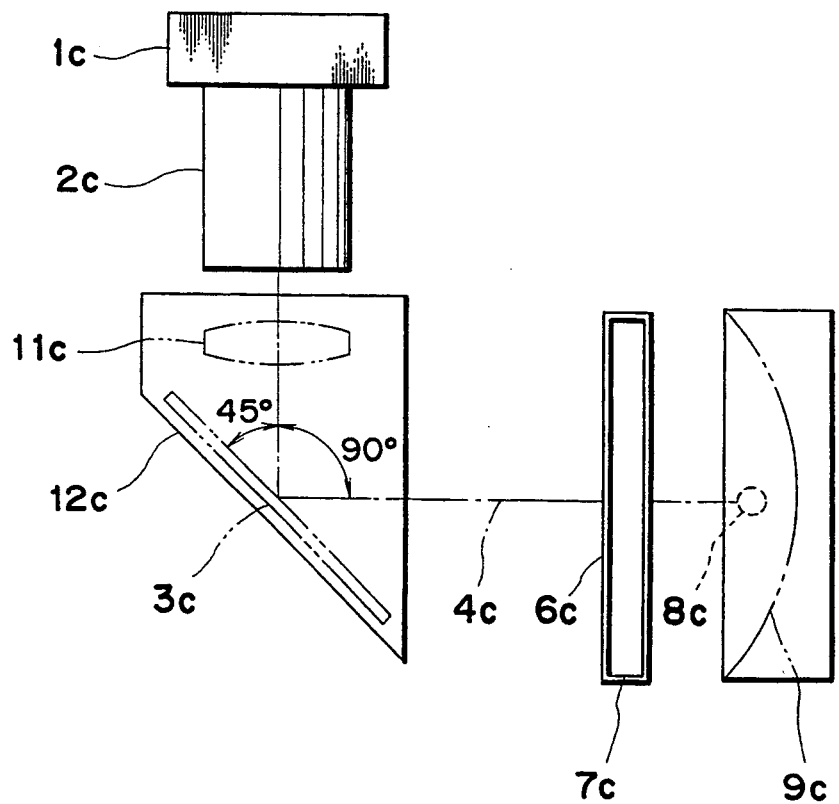
FIG. 22 is a sectional view of main part of the apparatus according to the seventh embodiment.

FIGS. 20, 21, and 22 are exploded side views showing other embodiments of the present invention. In the embodiment shown in FIG. 20, a main photographing lens and a conversion unit are arranged on a bottom portion, and the optical axis extends upward. An independent macro lens 11a is arranged along the optical axis, and a mirror 3a is arranged behind the lens 11a along the optical to be inclined at an angle of 45° from the horizontal plane. The mirror 3a and the macro lens 11a constitute an independent unit 12a. The mirror 3a deflects the optical axis through 90° in the horizontal direction, so that an image on a film held upside-down by a film holder 7a vertically arranged in an upper portion of the apparatus can be photographed.

In the embodiment shown in FIG. 21, a photographing lens 2b and a conversion unit 1b are horizontally arranged on a bottom portion, and an independent macro lens 11b is arranged along the optical axis. A mirror 3b is arranged behind the lens 11b along the optical axis to be inclined at an angle of 45° from the horizontal plane, and constitutes an independent unit 12b together with the macro lens 11b. The mirror 3b deflects the optical axis through 90° in the vertical direction, so that an image on a film held upside-down by a film holder 7b horizontally arranged in an upper portion of the apparatus can be photographed.

In the embodiment shown in FIG. 22, a film guide 6c, a light source 8c, and a reflection plate 9c are vertically arranged on a bottom portion, and a mirror 3c is arranged along the horizontal optical axis to be inclined at an angle of 45° from the horizontal axis so as to deflect the optical axis through 90° in the vertical direction. A macro lens 11c is arranged along the deflected optical axis, and constitutes an independent unit 12c together with the mirror 3c. A film can be photographed by a main photographing lens and the macro lens 1c arranged vertically in an upper portion of the apparatus.

As described above, according to the present invention, a macro lens portion is separately arranged, and a mirror portion and the macro lens portion constitute an independent unit, thus obtaining the following effect.

When an object other than a film such as a flat original (e.g., a printed matter), a three-dimensional object, a landscape, or the like is to be photographed, the unit including the mirror portion and the macro lens portion need only be detached from the apparatus. Therefore, an operation is simple, and operation efficiency can be improved.

Figure 31:
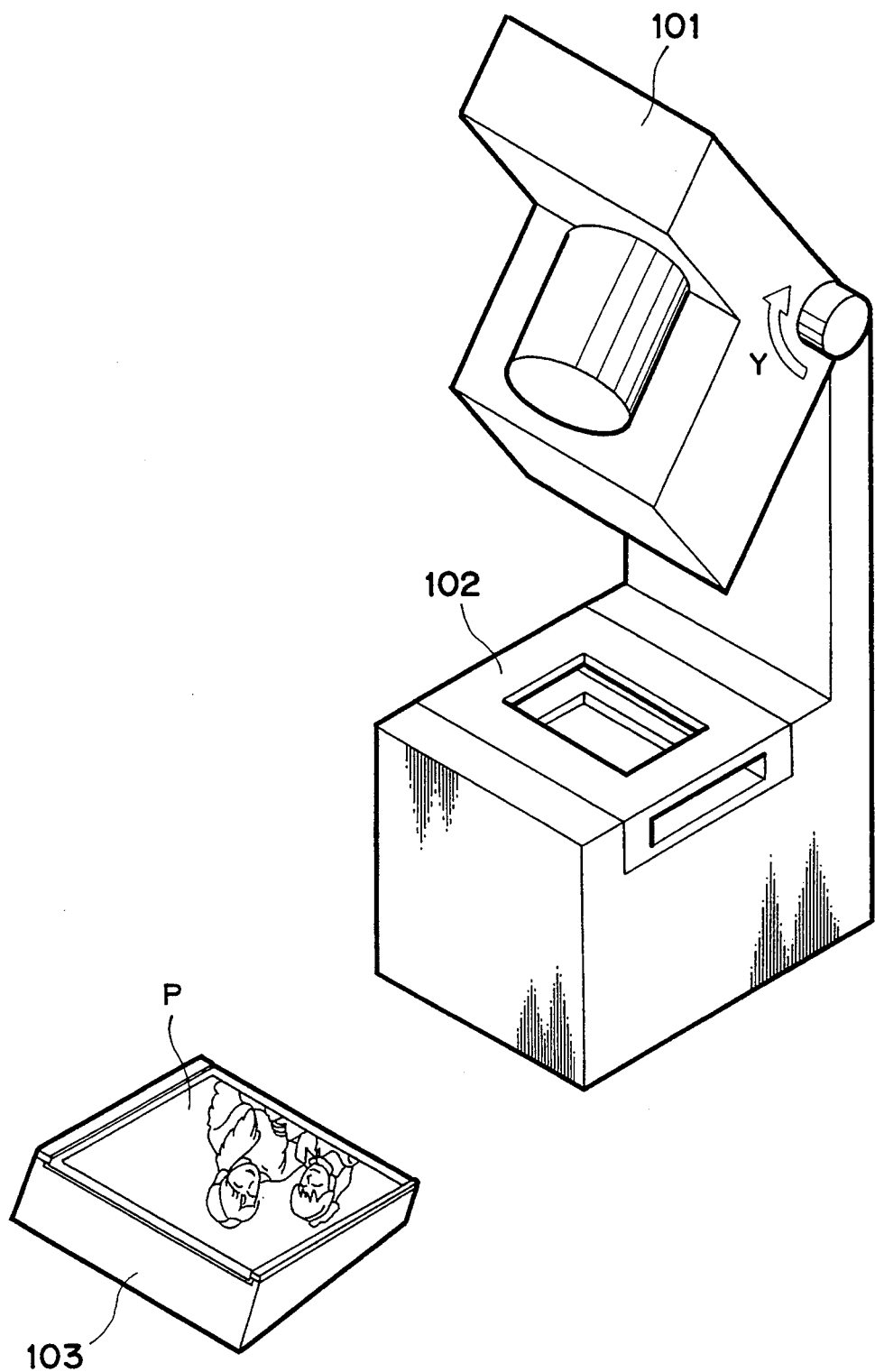
FIG. 31 is a perspective view of a conventional film photographing apparatus.

When a printed picture photographed by, e.g., a still camera is photographed in addition to the film, and is directly observed on a television screen, an apparatus shown in FIG. 31 is known.

More specifically, in a photographing apparatus shown in FIG. 31, an imaging optical system 101 constituted by a photographing system and an optical system is pivotally and axially supported on an upper portion of the apparatus, and a film guide 102 for receiving, e.g., a film and a printed picture holding member 103 for holding a printed picture P are arranged below the optical system 101.

As shown in FIG. 31, the imaging optical system 101, which is normally directed in the vertical direction to photograph a film, is inclined to photograph the printed picture P held by the printed picture holding member 103 arranged outside the photographing apparatus.

However, since the conventional apparatus described above has an arrangement designed mainly for a film photographing operation, it suffers from the following drawbacks.

(1) Delicate field angle adjustment and focus adjustment are required in correspondence with the size and position of a printed picture, and every time a printed picture is replaced, these operations must be repeated.

(2) When an object such as a printed picture larger than a film is to be photographed, a macro lens must be detached, and at this time, an image is undesirably set in an out-of-focus state in a short-distance photographing operation unless the zoom region is restricted.

(3) A holding member for holding a printed picture on the photographing optical axis is required, and a space for arranging the holding member is required outside the photographing apparatus main body.

A film photographing apparatus, which can eliminate the drawbacks of the conventional apparatus shown in FIG. 31, can easily and precisely perform field angle adjustment and focus adjustment even when an object is replaced, and can prevent luminance nonuniformity when an object such as a printed picture is to be photographed, will be described below.

In a film photographing apparatus to be described below according to an embodiment of the present invention, a holding portion for holding an object other than a film is provided to a film guide.

The film guide may be pivoted to a position opposing the photographing optical axis.

A switch interlocked with an attaching/detaching operation of a macro lens may be provided, and the zoom region can be restricted according to the ON/OFF state of the switch.

A switch, which is turned on/off to be interlocked with a pivotal movement of the film guide to a position opposing the photographing optical axis, may be arranged.

The switch interlocked with the pivotal motion of the film guide may turn on/off a light source of a film illumination unit, may restrict the zoom region of a photographing optical system, or may control to select a mirror image output of an image pickup element.

In the photographing apparatus with the above arrangement, since the position of a printed picture is restricted by the holding portion, neither field angle adjustment nor focus adjustment need be performed every time the printed picture is replaced.

When the macro lens is detached, the zoom region is restricted according to the ON/OFF state of the detection switch, and an out-of-focus state in a short-distance photographing operation can be prevented.

The illumination light source is turned off according to the ON/OFF state of the switch interlocked with the pivotal motion of the film guide in an operation other than a film photographing operation, thereby eliminating luminance nonuniformity, or selecting a zoom region according to an object, or allowing to observe an object image on a television screen.

This embodiment will be described below with reference to FIGS. 23A to 27.

Figure 23A:
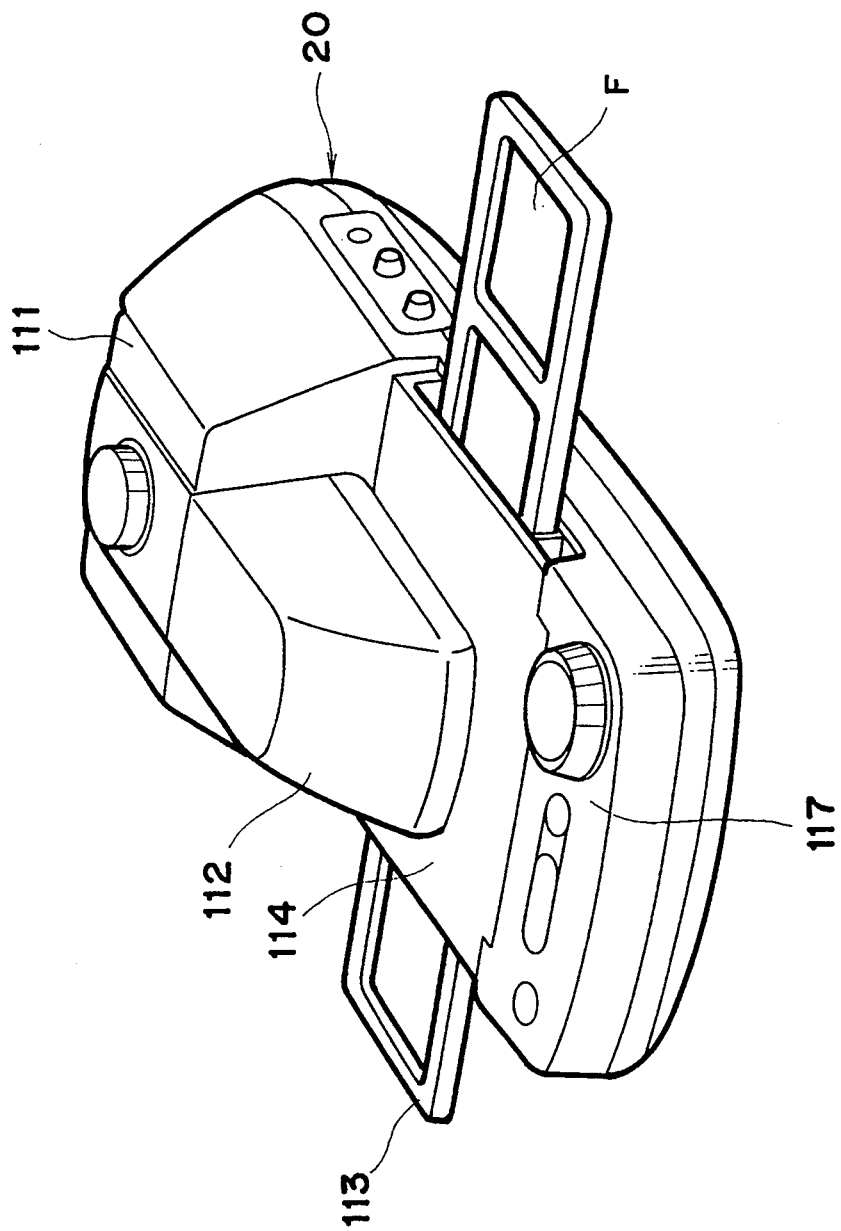
FIGS. 23A and 23B are perspective views of a film photographing apparatus according to the eighth embodiment of the present invention.
Figure 23B:
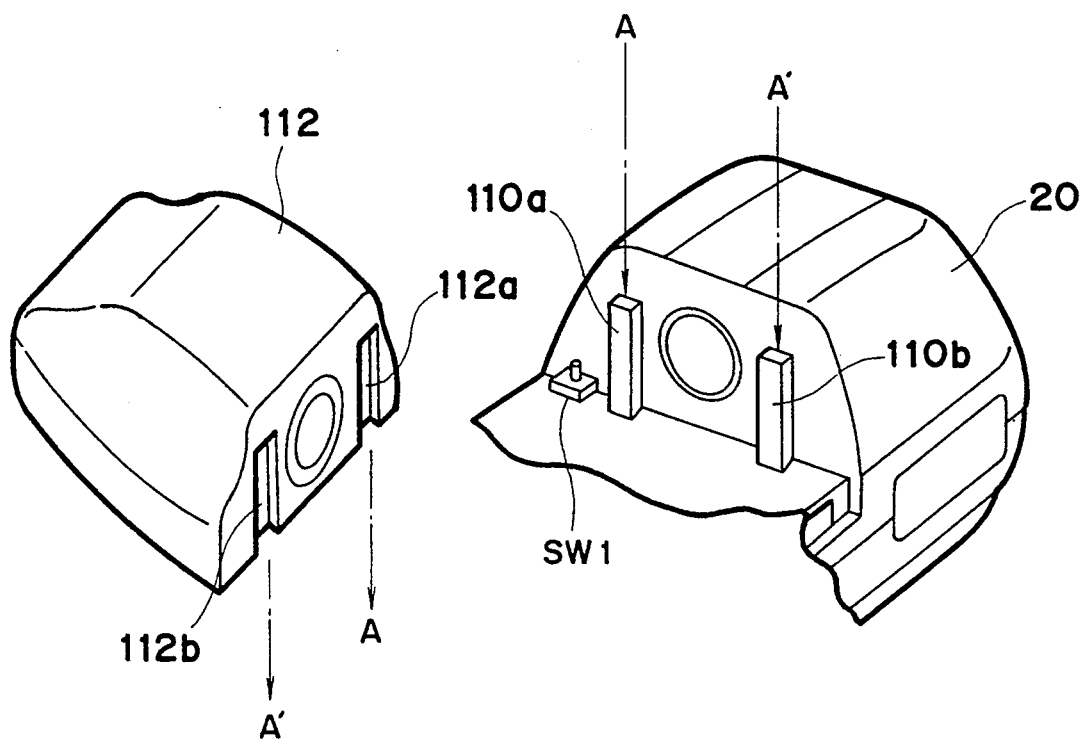
Figure 24:
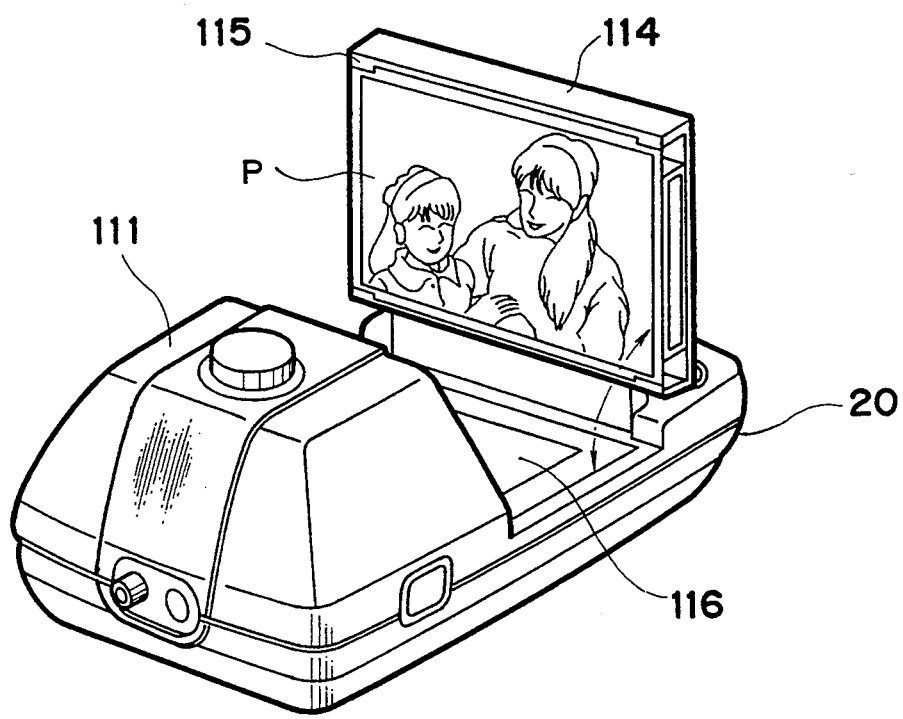
FIG. 24 is a perspective view of the eighth embodiment in a printed picture photographing mode.

FIG. 23A is a perspective view in a film photographing mode, FIG. 23B is a perspective view showing main part of FIG. 23A, and FIG. 24 is a perspective view in a printed picture photographing mode.

In FIGS. 23A and 23B and FIG. 24, a film photographing apparatus main body 20 includes an imaging optical system 111 constituted by a photographing system and a zoom optical system, and arranged on one side of the apparatus main body 20. A macro lens unit 112 has a mirror for deflecting the optical axis. The macro lens unit 112 is detachable from the film photographing apparatus main body 20 in the vertical direction indicated by A—A' in FIG. 23B by means of ridges 110a and 110b on the apparatus side having a substantially V-shaped section, and grooves 112a and 112b on the macro lens side having a substantially V-shaped section. A film holder 113 holds a film F, and is inserted in and held by a film guide 114. The film guide 114 is axially supported on the other side of the apparatus main body 20 to be pivotal in a direction of an arrow x. A holding portion 115 holds a printed picture P or a printed matter, and is arranged on the inner surface of the film guide 114. The film guide 114 is placed on an illumination unit 116, and the film F is illuminated by the unit 116. An operation unit 117 for performing various operations such as zooming, focusing, white balance adjustment, and the like is arranged on the side surface of the apparatus main body 20.

Figure 25:
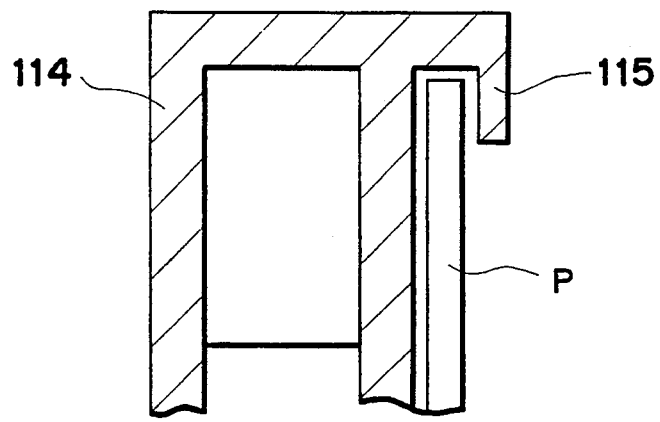
FIG. 25 is a sectional view of main part of a film guide of the eighth embodiment.

In this embodiment with the above-mentioned arrangement, when the printed picture P is to be photographed, the macro lens unit 112 attached to the film photographing apparatus is detached, as shown in FIG. 23B, and the film guide 114 is pivoted upward through 90° to stand upright so as to oppose the photographing optical axis of the imaging optical system 111, as shown in FIG. 24. Thereafter, as shown in FIG. 25, an object such as the printed picture P is inserted in the holding portion 115 of the film guide 114, and is photographed by the imaging optical system 111.

When the macro lens unit 112 is detached, a switch SW1 for detecting it is arranged, as shown in FIG. 23B, and the zoom region is restricted according to detachment of the macro lens unit 112. Thus, an out-of-focus state in a printed picture photographing mode (short-distance photographing mode) is prevented. This lens control will be described later.

Figure 26:
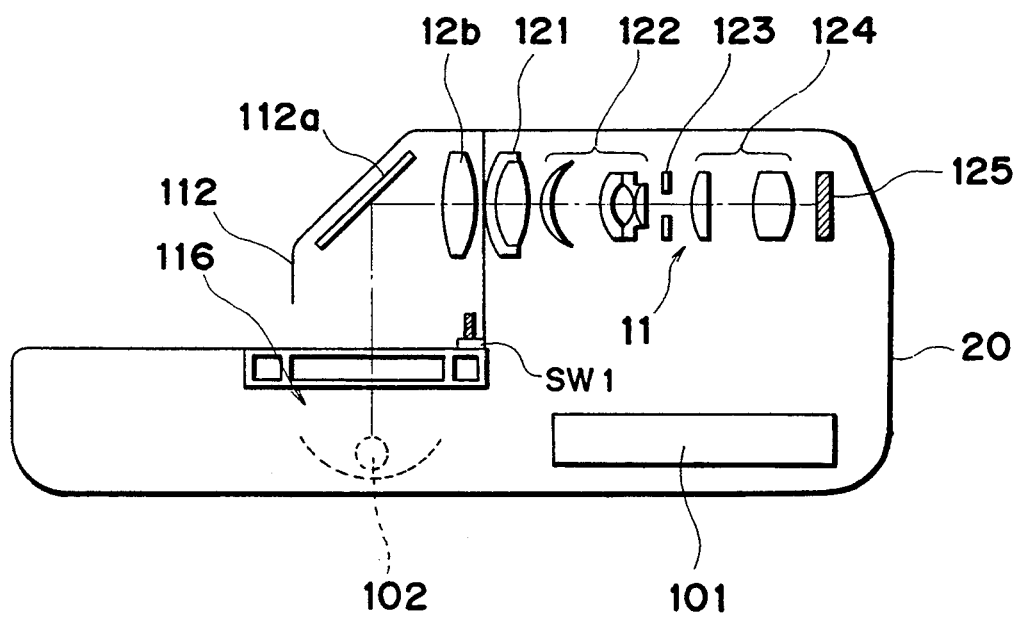
FIG. 26 is a sectional view showing a lens optical system of the eighth embodiment.

The optical system of the film photographing apparatus of this embodiment will be described below with reference to FIG. 26. FIG. 26 is a side sectional view of the film photographing apparatus. As can be seen from FIG. 26, a macro lens 112b and a mirror 112a for guiding a film image on the film guide 114 to the lens optical axis are arranged in the macro lens unit 112 detachable from the film photographing apparatus.

As for the optical system in the film photographing apparatus main body 20, a front-element lens 121, a zoom lens 122 for performing a zooming operation, an aperture stop 123, a focus lens (compensator lens) 124, and an image pickup element 125 such as a CCD are arranged along the optical system. An object image imaged by these lenses is photoelectrically converted into a video signal, and the video signal is supplied to a monitor display or a recorder (neither are shown) via a camera processing circuit 126, thus displaying or recording the photographed image.

An electrical circuit block 101 comprises, e.g., a printed circuit board mounting various electrical circuits. The switch SW1 detects the attaching/detaching operation of the macro lens unit 112, as has been described above with reference to FIG. 23B. In addition, a light source 102 is included in the illumination unit 116 for illuminating the film.

Various lens control operations and the arrangement of a signal processing circuit of the film photographing apparatus 20 will be described below with reference to the block diagram shown in FIG. 27.

Figure 27:
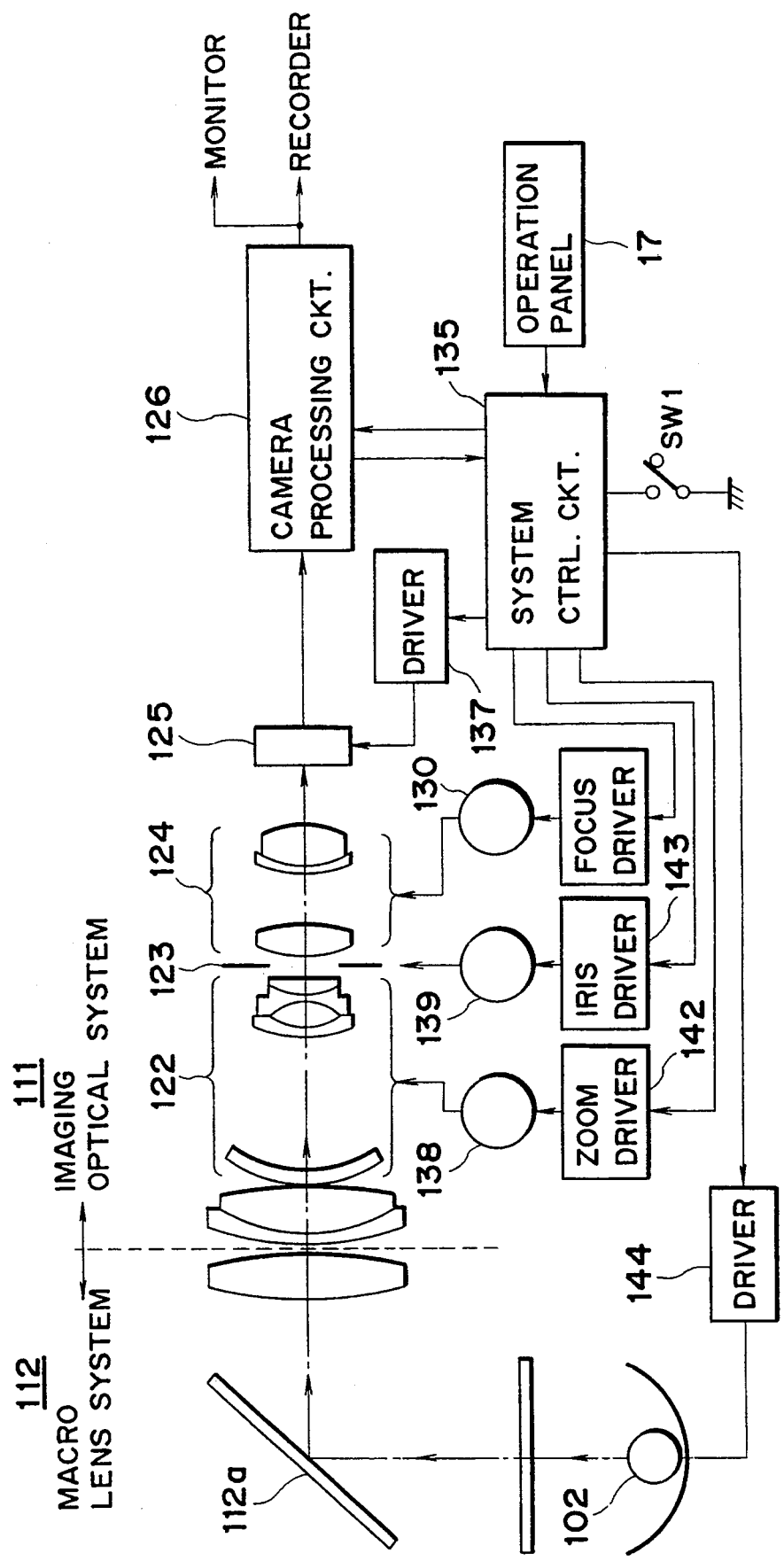
FIG. 27 is a block diagram showing a circuit arrangement of the eighth embodiment.

In FIG. 27, motors 138, 139, and 130 for driving the zoom lens 122, the aperture stop 123, and the focus lens 124 are respectively controlled by a zoom driver 141, an iris driver 142, and a focus driver 143. These drivers are controlled by a system control circuit 135 (to be described later).

An object image imaged by the above-mentioned lenses is photoelectrically converted into a video signal by the CCD 125, and the video signal is subjected to predetermined signal processing by the camera processing circuit 126. Thereafter, the video signal is supplied to a monitor display, a floppy disk drive or a recorder such as a video tape recorder (not shown) as a normalized video signal.

A luminance signal Y obtained from the camera processing circuit 126 is supplied to the system control circuit 135, and is used in an auto-focus operation and an auto-iris operation. The CCD 125 is driven by a driver 137, which is operated according to an instruction from the system control circuit 135 (to be described later) together with the camera processing circuit 126.

The operation state of the operation unit 117 provided with various operation switches is supplied to the system control circuit 135.

The light source 102 for illuminating a film is driven by a driver 144.

The state of the switch SW1, which is turned on/off according to the attaching/detaching operation of the macro lens unit 112, is supplied to the system control circuit 135,.and the imaging optical system 111 is controlled on the basis of this information. Since the moving range of the zoom lens 122 and the focus lens 124 in the imaging optical system differs depending on whether the macro lens system is used, information indicating whether or not a macro photographing operation is performed is required for properly controlling these lenses.

The system control circuit 135 comprises a CPU for systematically controlling the overall apparatus. The system control circuit 135 controls the drivers for driving the lenses and the aperture stop, and also controls the driving operations of the light source 102, the CCD 125, and the camera processing circuit 126. The system control circuit 135 sets various operation modes according to the operation state of the operation unit 117, and performs control operations according to these modes.

The switch SW1 is turned on when the macro lens unit 112 is inserted in the imaging optical system, and is turned off when the macro lens unit 112 is detached. The system control circuit 135 controls the imaging optical system according to the ON/OFF state of the switch SW1.

More specifically, in a film photographing state using the macro lens unit 112, the system control circuit 135 controls to move the zoom lens 122 over the entire moving range. Therefore, when the macro lens unit 112 is detached, the moving range of the zoom lens must be restricted in correspondence with the field angle. If the zoom lens is moved over the entire range while the macro lens unit is detached, a background image outside an object is undesirably photographed according to an increase in field angle.

In a so-called inner-focus type lens for changing the focal plane upon movement of the zoom lens 122 like in this embodiment, the movement of the zoom lens 122 and the movement of the focus lens 124 are closely related with each other, and the zoom lens 122 must often be simultaneously moved upon focusing. Therefore, the moving range of the zoom lens 122 must be restricted from the viewpoint of focusing.

In order to solve the above problem, the system control circuit 135 controls the driving operations of the lenses according to the ON/OFF state of the switch SW1.

According to the film photographing apparatus of this embodiment, since the driving operation of the imaging optical system 111 is automatically controlled by detecting the macro lens unit 112, both a film photographing operation using the macro lens and a printed picture photographing operation using no macro lens can always be performed in an optimal state.

Figure 28:
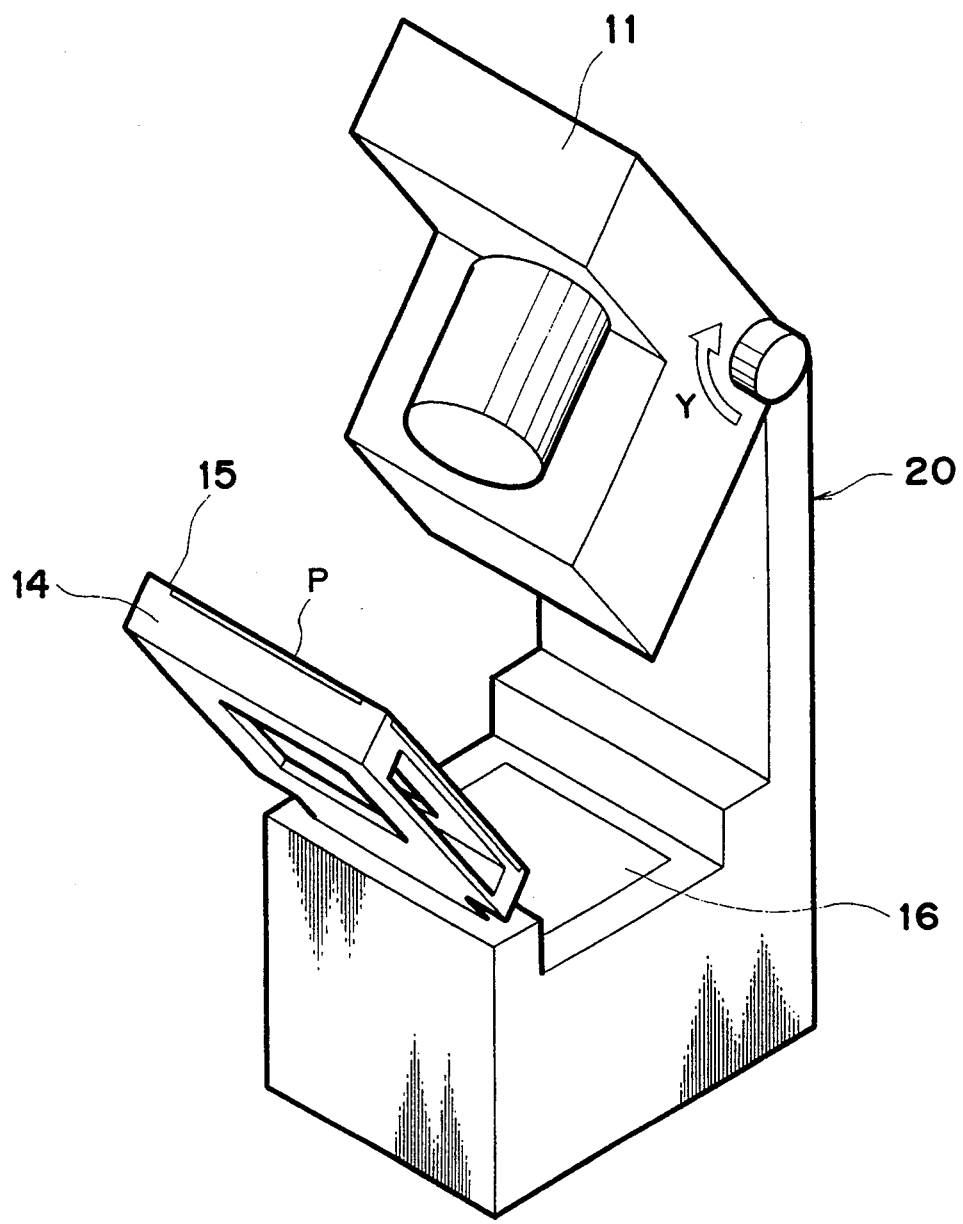
FIG. 28 is a perspective view showing a film photographing apparatus according to the ninth embodiment of the present invention.

FIG. 28 shows the ninth embodiment of the present invention. For the sake of simplicity, the same reference numerals in FIG. 28 denote the same parts as in the above embodiment, and only a difference will be described below.

In this embodiment, an imaging optical system 111 and a film guide 114 are arranged at two end portions of an L-shaped apparatus main body 20 to be pivotal in a direction of an arrow y through a predetermined angle, so that they can oppose each other without going through a mirror. Other arrangements are the same as those in the above embodiment.

In this embodiment with the above-mentioned arrangement, when a printed picture P is to be photographed, both the imaging optical system 111 and the film guide 114 are pivoted, so that the film guide 114 opposes the photographing optical axis of the imaging optical system 111. In this state, the printed picture P is inserted in a holding portion 115, and is photographed.

In this case, when a macro lens unit (not shown) is detached, a switch for detecting it is arranged so as to restrict the zoom region, thereby preventing an out-of-focus state in a short-distance photographing operation.

Figure 29A:
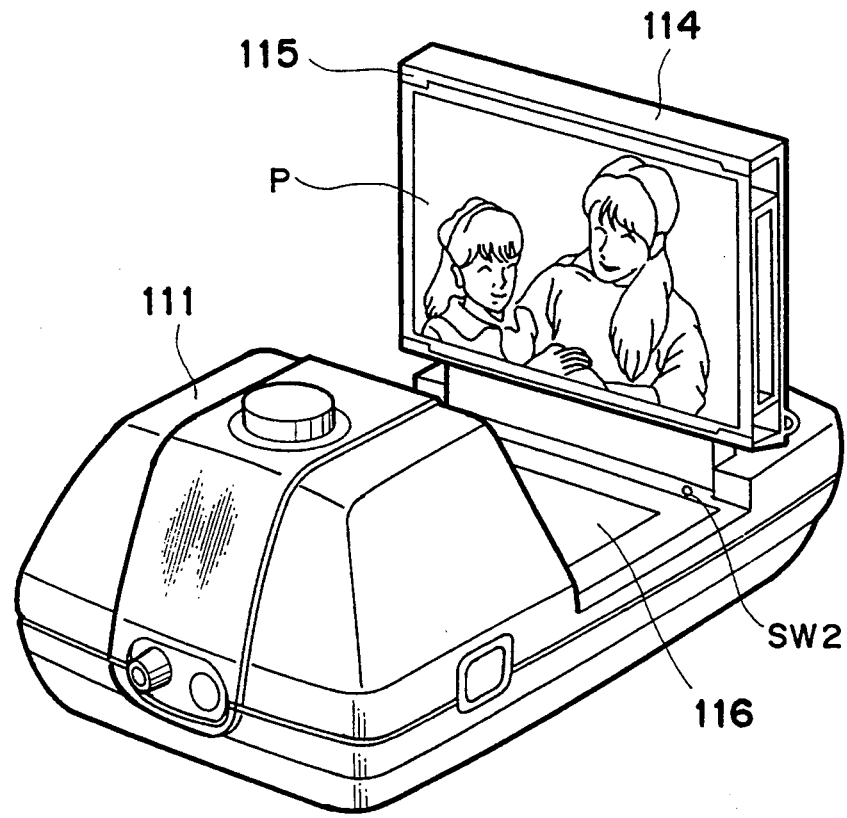
FIGS. 29A and 29B are perspective views showing a film photographing apparatus in a printed picture photographing mode according to the 10th embodiment of the present invention.
Figure 29B:
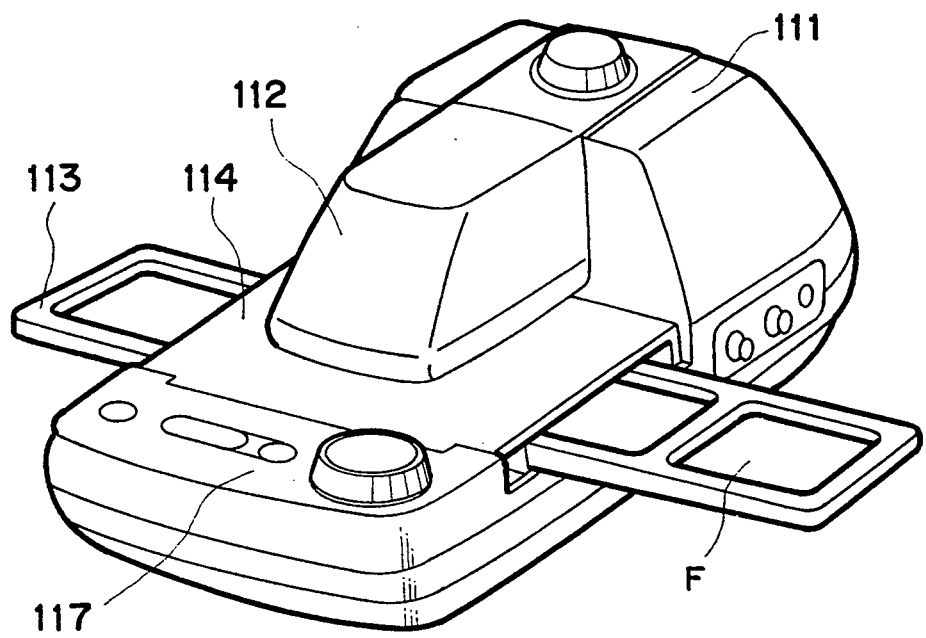

FIGS. 29A and 29B show the 10th embodiment of the present invention. For the sake of simplicity, the same reference numerals in FIGS. 29A and 29B denote the same parts as in the above embodiment, and only a difference will be described below. The circuit blocks of this embodiment are basically the same as those in the block diagram of FIG. 27, except for a function of a switch SW2 (to be described later), and some control operations corresponding to this function.

In this embodiment, a switch SW2, which is turned on to be interlocked with a pivotal motion of a film guide 114 from a state shown in FIG. 29B to an upright state shown in FIG. 29A, is arranged on the outer edge portion of the upper surface of an illumination unit 116 for illuminating a film. When the switch SW2 is turned on, a light source in the illumination unit 116 is turned off, and a signal for restricting the zoom region of an optical system is output. Other arrangements are the same as those in the above embodiment. In this case, the above-mentioned switch SW1 for detecting the attaching/detaching operation of a macro lens unit 112 can be omitted.

In this embodiment with the above-mentioned arrangement, the macro lens unit 112 is detached from a use state in a film photographing mode using a film holder 113 in the film guide 114 shown in FIG. 29A, and the film guide 114 is pivoted through 90° to oppose the photographing optical axis, as shown in FIG. 29A. At this time, the switch SW2, which was biased by the film guide 114, is turned on to turn off the light source of the illumination unit 116, and to supply a signal for restricting the zoom region of a zoom optical system of an imaging optical system 111 to an optical system control circuit (not shown). A printed picture P is inserted in a holding portion 115 of the film guide 114, and is photographed by the imaging optical system.

When the film guide 114 is pivoted through 90° from the state shown in FIG. 29A to restore the state shown in FIG. 29B, the switch SW2 is turned off since it is pressed by the film guide 114. Thus, the light source of the illumination unit 116 is turned on, and the zoom region restriction of the imaging optical system is canceled. Thus, a general object such as a landscape can be photographed.

As described above, when the film guide 114 stands upright to photograph, e.g., the printed picture P, the adverse influences such as illuminance nonuniformity, a shift in white balance, and the like caused by the light source of the illumination unit 116 can be eliminated. In a state wherein only the macro lens unit 112 is detached, a general photographing operation is allowed over the entire zoom region. Furthermore, in a photographing mode of the printed picture P, the zoom region of the optical system is restricted, and can be selected so as not to cause an out-of-focus state in a short-distance photographing operation.

When the photographing apparatus of this embodiment uses an image pickup element on a focal plane, the switching operation of a mirror image output of the image pickup element may be controlled according to the ON/OFF state of the switch SW2.

More specifically, when a film F is to be photographed, as shown in FIG. 29B, since a photographer who executes actual operations opposes the imaging optical system, an image on a film observed by the photographer is reversed from an image displayed on a monitor display such as a television receiver. On the other hand, when the printed picture P is to be photographed, as shown in FIG. 29A, since the observation direction of the photographer coincides with that of the imaging optical system, an image is not reversed.

Therefore, when the film guide 114 is set in the state shown in FIG. 29B, the switch SW2 is turned off, and the output from the image pickup element used in the photographing system of the imaging optical system is output as a mirror image output to a system control circuit of the apparatus main body. When the film guide 114 is pivoted in an upright state, and the switch SW2 is turned on, as shown in FIG. 29A, the mirror image output of the image pickup element is switched to a normal output.

In this manner, an object image observed by the photographer can be directly displayed on the television screen.

Figure 30:
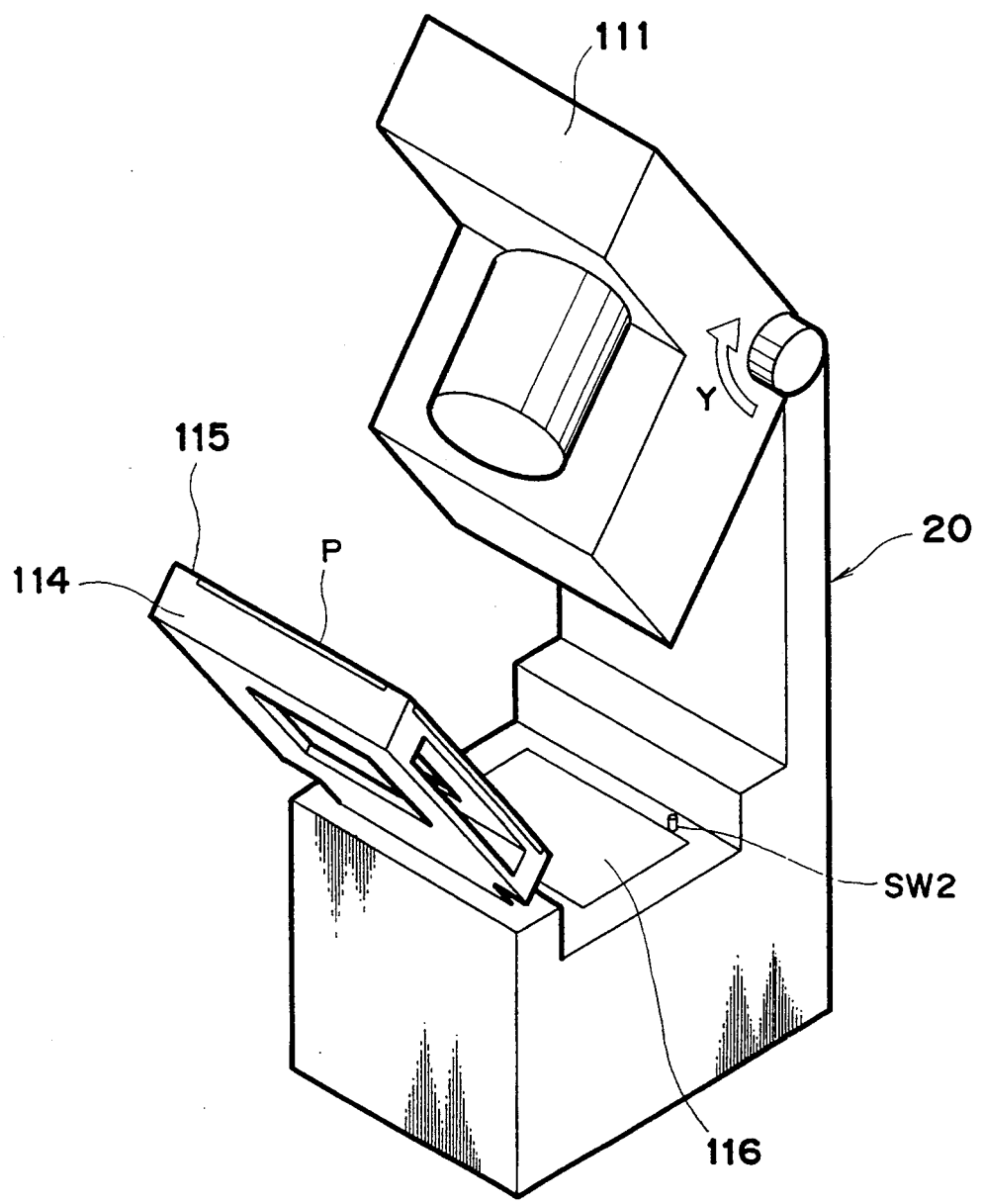
FIG. 30 is a perspective view showing a film photographing apparatus in a printed picture photographing mode according to the 11th embodiment of the present invention.

FIG. 30 shows the 11th embodiment of the present invention.

This embodiment corresponds to a modification of the above embodiment. A difference is that a switch SW2 arranged on the outer edge portion of the upper surface of an illumination unit 116 is turned on in synchronism with a pivotal motion of a film guide 114, and an operation executed according to the ON/OFF state of the switch SW2 is the same as the above embodiment.

According to the present invention, as described above, since a holding portion for holding an object other than a film is provided to a film guide, and the film guide is pivoted to a position opposing the photographing optical axis, a printed picture as an object is held by the holding portion of the film guide while its position is regulated. Therefore, neither field angle adjustment nor focus adjustment are required every time a printed picture is replaced, no new holding member need be added, and no space other than the apparatus main body is required.

Furthermore, a switch interlocked with an attaching-/detaching operation of a macro lens is provided, and the zoom region is restricted according to the ON/OFF state of the switch, thereby preventing an out-of-focus state in a short-distance photographing operation when the macro lens is detached.

In addition, since a switch, which is turned on/off in synchronism with the pivotal motion of the film guide to the position opposing the photographing optical axis, is arranged to turn on/off .an illumination light source for a film, the illumination light source is turned off in a photographing mode of an object other than a film, thereby preventing luminance nonuniformity and a white balance error. In addition, when the zoom region of a photographing optical system is restricted according to the ON/OFF state of the switch, the zoom region can be easily set. When the switching operation of a mirror image output of an image pickup element is controlled according to the ON/OFF state of the switch, an object image observed by a photographer can be directly displayed on a television screen even when a film or a printed picture is to be photographed.

An embodiment, which improves an illumination system, will be described below.

Figure 32A:
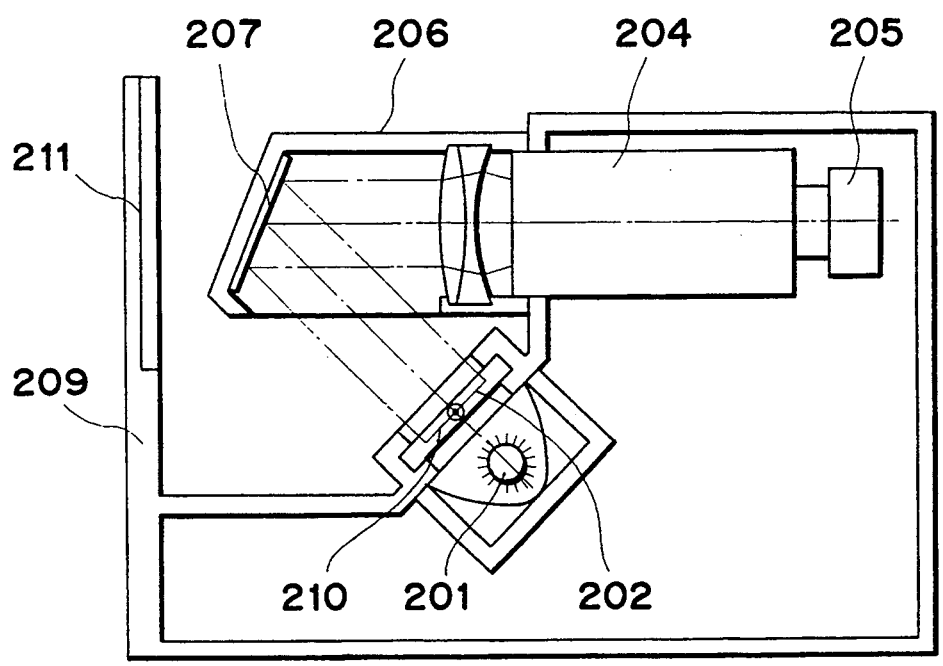
FIGS. 32A and 32B are front views respectively in a photographing mode for photographing an image on an optical film and in a photographing mode for photographing a printed object according to the 12th embodiment of the present invention.
Figure 32B:
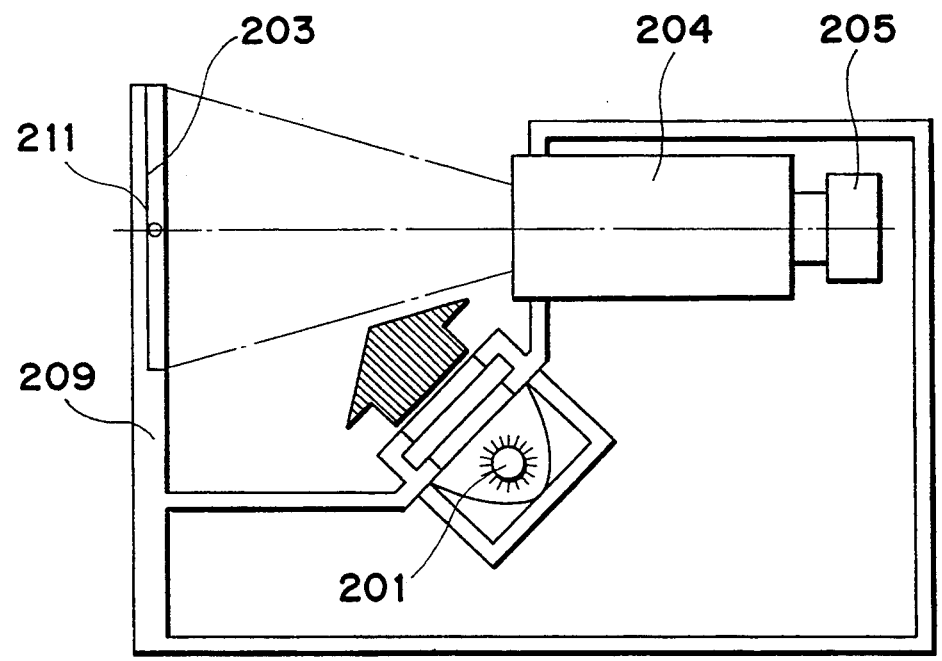
Figure 33A:
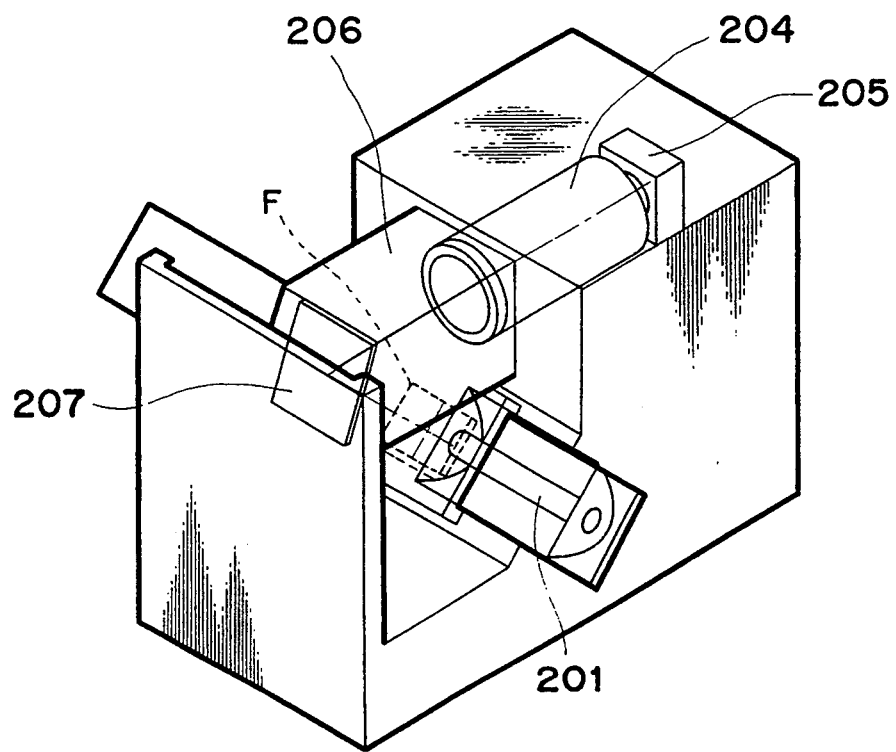
FIGS. 33A and 33B are respectively perspective views of FIGS. 32A and 32B.
Figure 33B:
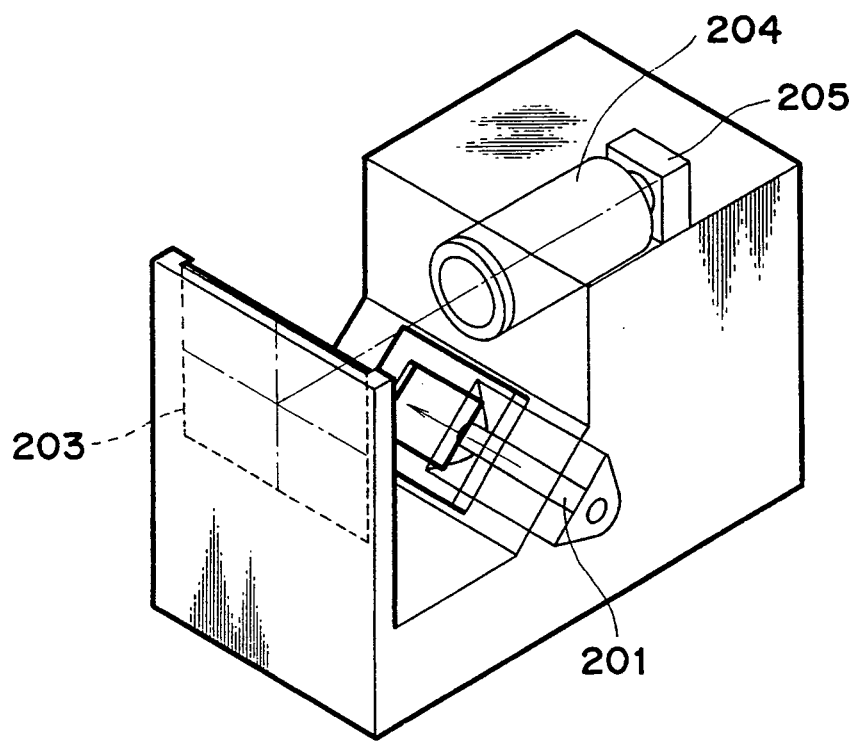

FIGS. 32A and 32B show the 12th embodiment of the present invention, and are respectively a front view upon photographing of an image on an optical film F, and a front view upon photographing of a printed matter. FIGS. 33A and 33B are respectively perspective views of FIGS. 32A and 32B.

An apparatus shown in FIGS. 32A and 32B includes an optical attachment 206 used for photographing an optical film, a photographing mirror 207, an illumination mirror 208, a main body 209, an optical film setting surface 210, and a printed matter setting surface 211.

An explanation about FIG. 32A will be given first.

When a light source 201 incorporated in the main body 20 and used for photographing an optical film is turned on, light emitted from the light source 201 is transmitted through the optical film F set in advance on the optical film setting surface 210, and is incident on the optical attachment 206.

In the optical attachment 206, the light is reflected by the photographing mirror 207, is adjusted by an optical film photographing lens, and thereafter, reaches an optical block 204. The light is then transmitted through a photographing optical system in the optical block 204, and is imaged on an image pickup element in a photographing block 205. Thus, an image formed on the image pickup element is photographed.

In the case of FIG. 32B, the optical attachment 206 is removed. Thus, an optical image of a printed matter 203 set on the printed matter setting surface 211 is directly fetched by the optical block 204, is transmitted through the photographing optical system in the optical block 204, and is imaged on the image pickup element in the photographing block 205. Then, an image formed on the image pickup element is photographed.

At this time, illumination for a photographing operation is directly obtained by light radiated in a direction of an arrow by turning on the light source 201 used for photographing an optical film. For this reason, sufficient illumination can be obtained without using another light source such as an external light source.

Figure 35:
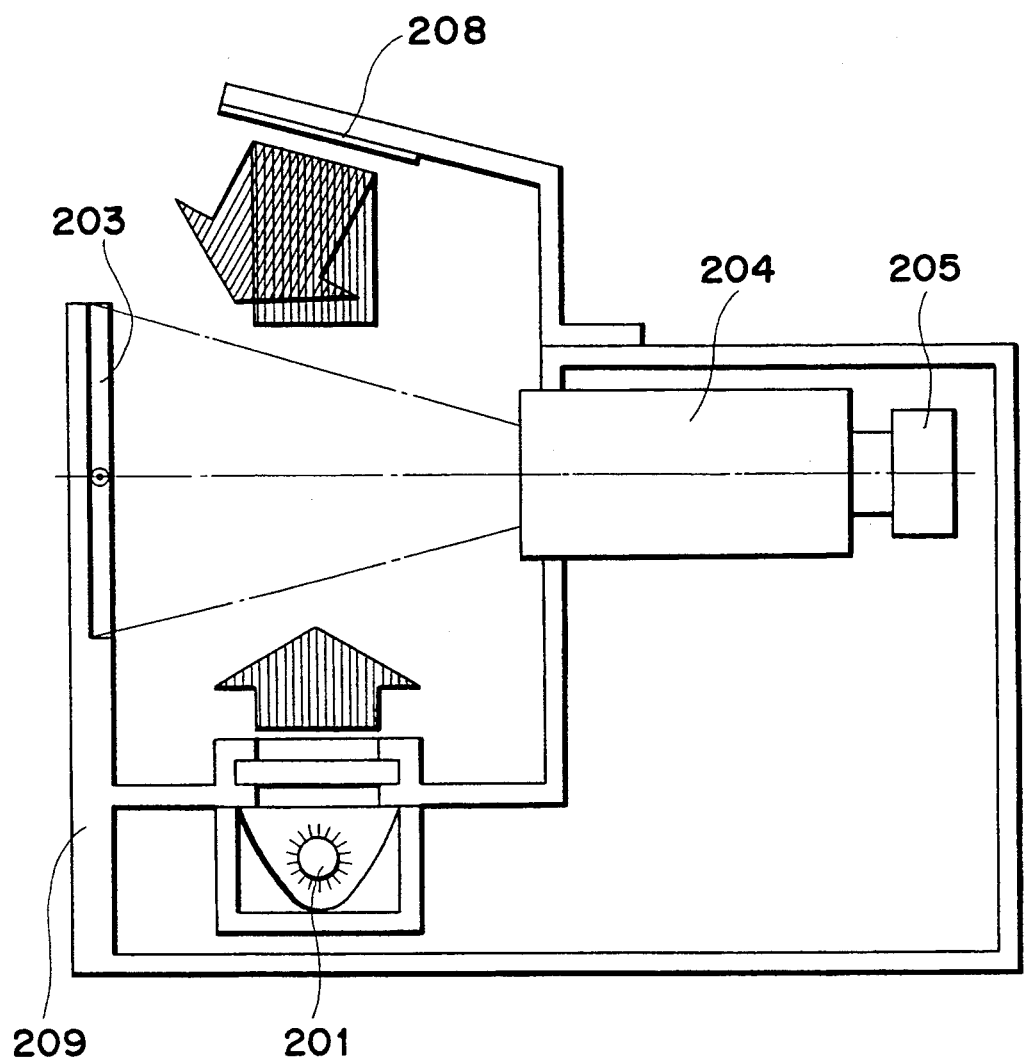
FIG. 35 is a front view according to the 13th embodiment of the present invention.

As a method of illuminating the printed matter 203 with the light source 201, a method shown in FIG. 35 may be adopted.

FIG. 35 is a front view showing the 13th embodiment of the present invention.

The embodiment shown in FIG. 35 requires members such as an illumination mirror 208, and the like. On the other hand, the embodiment shown in an explanatory view of FIG. 34 proposes a structure wherein the optical film setting surface 210 and the printed matter setting surface 211 are arranged to define an angle of less than 90° therebetween. With this structure, illumination light emitted from the light source 201 used for photographing an optical film directly reaches the printed matter 203 without requiring extra members, and remarkably practical effects about a simple, compact, and low-cost structure of the apparatus can be expected.

Figure 36A:
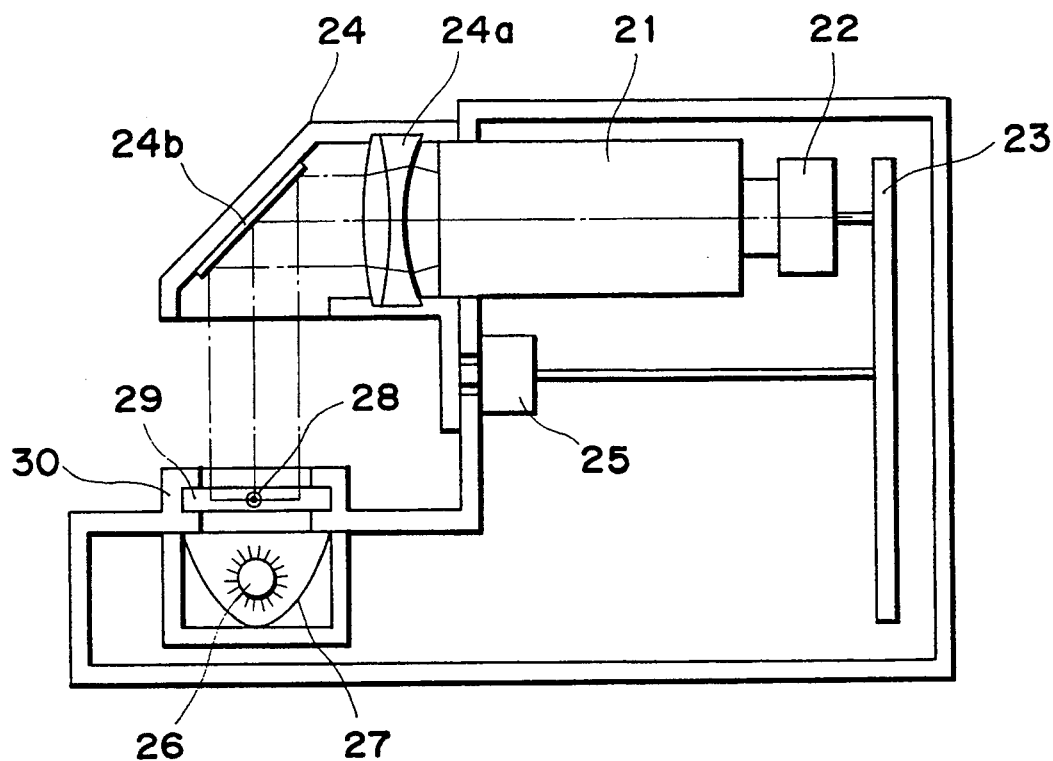
FIGS. 36A and 36B are respectively front views in a film photographing mode and in a landscape photographing mode according to the 14th embodiment of the present invention.
Figure 36B:
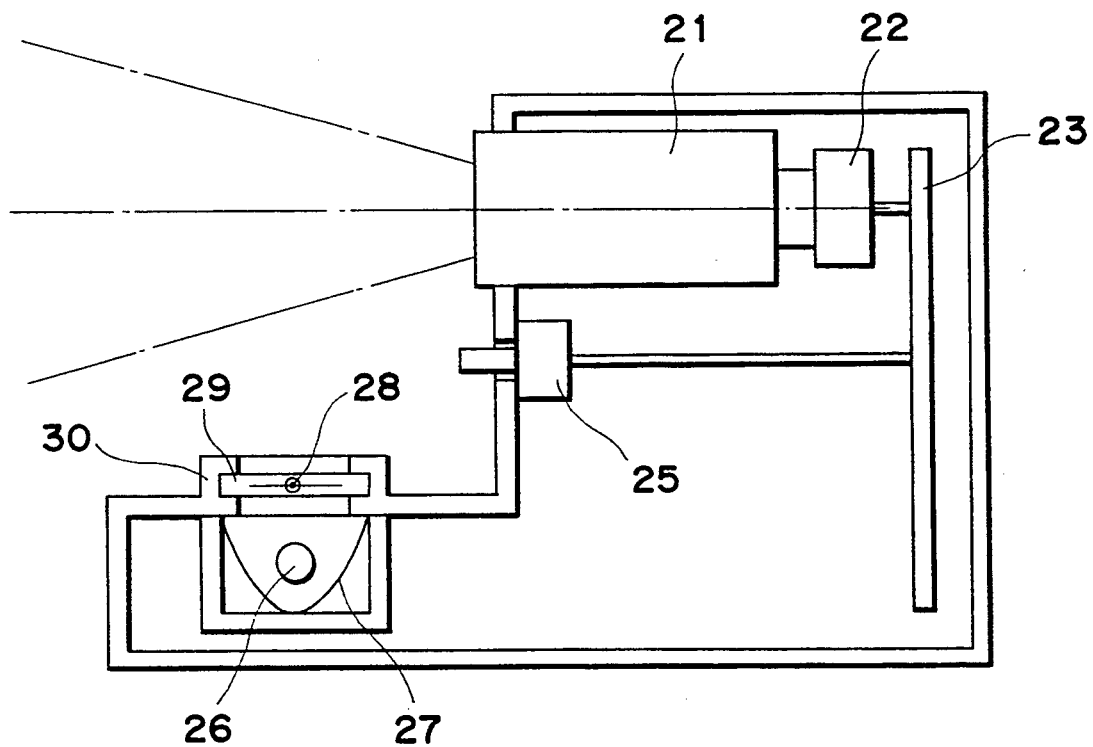

FIGS. 36A and 36B show the 14th embodiment of the present invention, and are respectively a front view in a film photographing mode, and a front view in a landscape photographing mode.

In the landscape photographing mode shown in FIG. 36B, an optical unit 224 is removed, and a light source 226 is kept OFF. Like in a video photographing mode, an external image such as a landscape is transmitted through an optical block 221, and is imaged on an image pickup element in a photographing block 222. An image formed on the image pickup element is photographed. In this case, a unit detection switch 225 is kept OFF, and a photographed normal image is directly output.

The film photographing mode shown in FIG. 36A will be described below.

The optical unit 224 is attached to the main body. The light source 226 is turned on. Light condensed by a reflection plate 227 is transmitted through a film 228, and an optical image of the film is guided to the optical unit 224. The optical image input to the optical unit 224 is reflected by a mirror portion 224b to propagate toward the optical block 221. At this time, the optical image is a mirror image.

Thereafter, the optical image is adjusted by a lens portion 224a, is transmitted through the optical block 221, and is imaged on the image pickup element like in the landscape photographing mode. The image formed on the image pickup element is photographed. The photographed image is a mirror image. On the other hand, since the optical unit 224 is attached, the unit detection switch 225 is turned on, and a mirror image of the photographed image (mirror image) is output based on the ON state of the switch 225. Consequently, an output image is a normal image as a mirror image of the photographed mirror image.

Figure 37A:
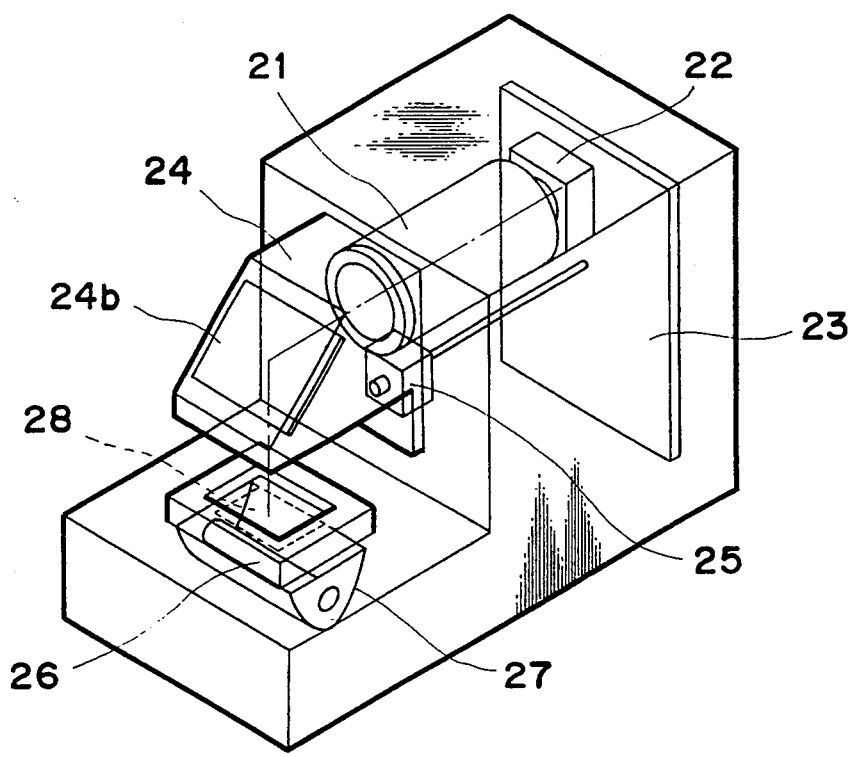
FIGS. 37A and 37B are respectively perspective views of FIGS. 36A and 36B.
Figure 37B:
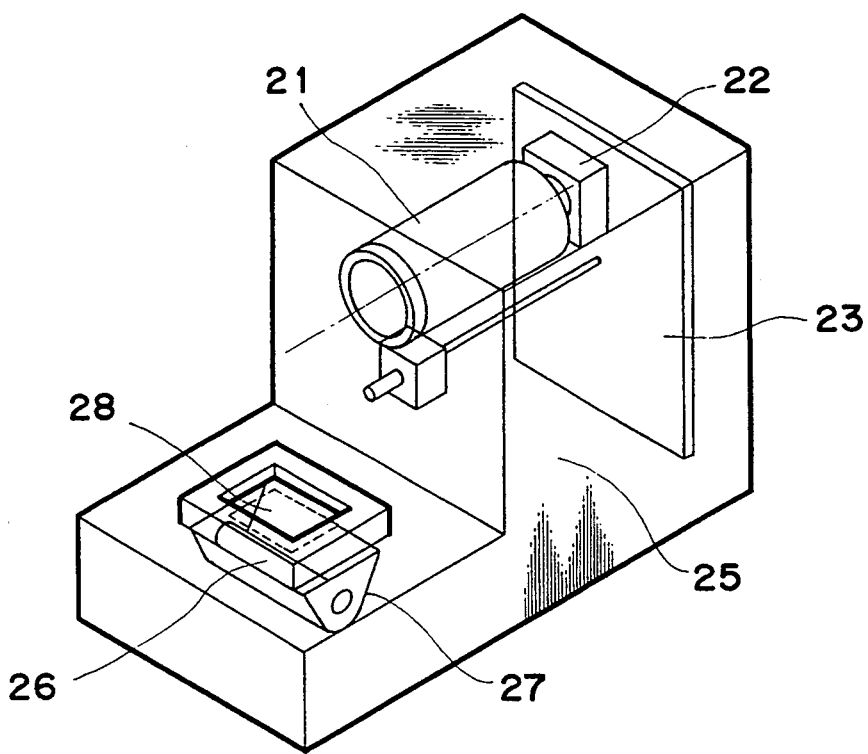

Note that FIGS. 37A and 37B are respectively perspective views of FIGS. 36A and 36B.

Figure 38:
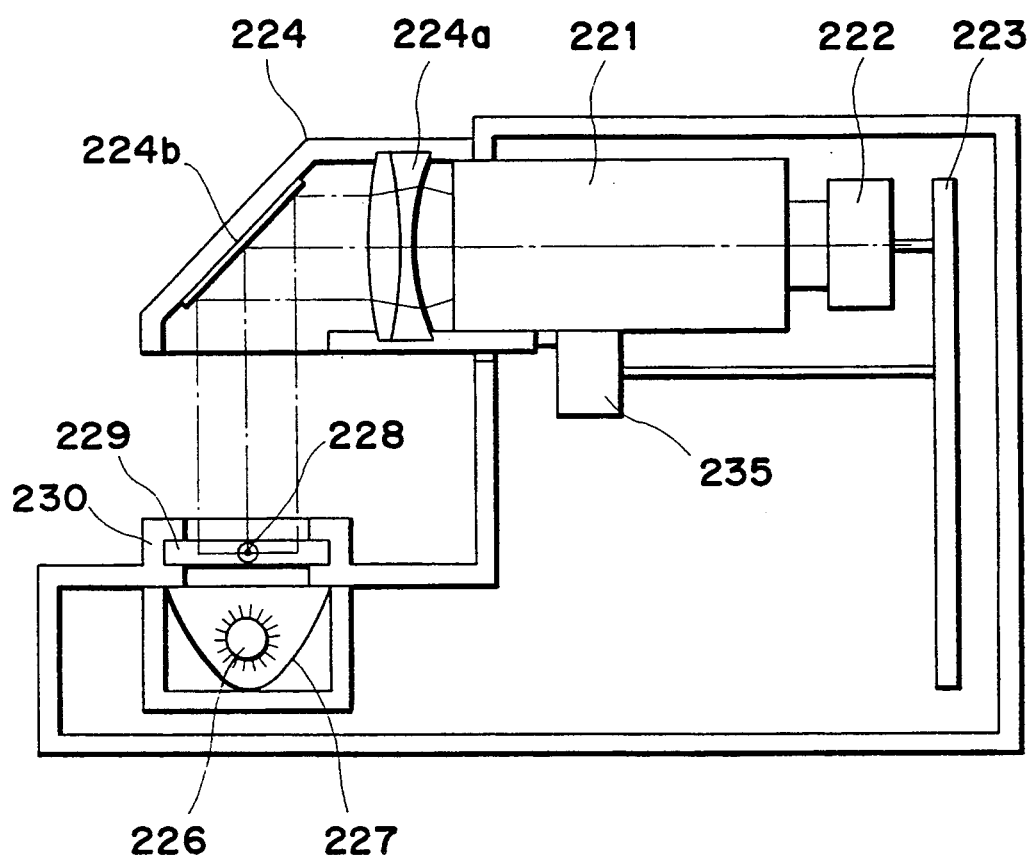
FIG. 38 is a front view according to the 15th embodiment of the present invention.

FIG. 38 is a front view showing the 15th embodiment of the present invention. This embodiment adopts a structure wherein when an optical unit is attached, the unit partially enters the main body to depress a unit detection unit 235.

The operations at this time are the same as those in the embodiment shown in FIGS. 36A to 37B. However, the following effects are also expected.

① Since a flange portion of the optical unit is omitted, the apparatus can be rendered compact.

② Since a detection portion is arranged inside the apparatus, an erroneous operation caused by an external force can be prevented.

As described above, in a photographing apparatus, which can photograph an image formed on an optical film and a printed matter, the printed matter is illuminated with the light source used for photographing an optical film. As a method of illuminating the printed matter, a structure wherein the optical film setting surface and the printed matter setting surface are arranged to define an angle of less than 90° is adopted, so that both the optical film and the printed matter can be illuminated by a single light source without adding extra members. As a result, a simple, compact, and low-cost apparatus with good operability can be realized.

Furthermore, in a photographing apparatus for photographing an image formed on an optical film, a switch for detecting attachment/detachment of an optical unit having a mirror portion is arranged, and a normal image output and a mirror image output are switched according to a detection signal from the switch. Thus, a change in photographing state upon attachment/detachment of the optical unit is corrected without requiring special operations, and an erect normal image output can always be obtained.

What is claimed is:

1. An apparatus comprising:
   objective lens means for receiving an image;
   sensor means for reading the image obtained by said objective lens means;
   illumination means for illuminating a film;
   a main body containing said objective lens means, said sensor means and said illumination means;
   a rotatable member rotating around a predetermined axis relating to said main body, said rotatable member provided with a guide portion for guiding said film and a holding portion for holding a printed object; and
   a supporting means for supporting a reflection member wherein said supporting means is detachable from said main body and said reflection member introduces light coming from said film onto said objective lens means when the supporting means is attached to said main body.

* * * * *